US011169286B2

United States Patent
Guliyev et al.

(10) Patent No.: US 11,169,286 B2
(45) Date of Patent: Nov. 9, 2021

(54) METHODS OF CALIBRATING SEMICONDUCTOR RADIATION DETECTORS USING K-EDGE FILTERS

(71) Applicant: REDLEN TECHNOLOGIES, INC., Saanichton (CA)

(72) Inventors: Elmaddin Guliyev, Vancouver (CA); Georgios Prekas, Victoria (CA); Michael Rozler, Victoria (CA); Krzysztof Iniewski, Coquitlam (CA); Jean Marcoux, Montreal (CA); Conny Hansson, Victoria (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 41 days.

(21) Appl. No.: 16/155,786

(22) Filed: Oct. 9, 2018

(65) Prior Publication Data

US 2019/0383956 A1    Dec. 19, 2019

Related U.S. Application Data

(60) Provisional application No. 62/686,250, filed on Jun. 18, 2018.

(51) Int. Cl.
*G01T 7/04*    (2006.01)
*G01T 7/00*    (2006.01)
*G01T 1/24*    (2006.01)

(52) U.S. Cl.
CPC ............... *G01T 7/005* (2013.01); *G01T 1/24* (2013.01)

(58) Field of Classification Search
CPC ......... G01T 7/005; G01T 1/24; G01T 1/1648; G01N 21/274; G06T 11/005
See application file for complete search history.

(56) References Cited

U.S. PATENT DOCUMENTS 5,604,608 A    2/1997  Walsh et al.
6,020,773 A    2/2000  Kan et al.
(Continued)

OTHER PUBLICATIONS

Kalender, W.A., "Trends in X-Ray CT Imaging and Respective Demands on Detectors," Institute of Medical Physics, iworid 2008, Helsinki, 33 pages, (2008).
(Continued)

*Primary Examiner* — David P Porta
*Assistant Examiner* — Mamadou Faye
(74) *Attorney, Agent, or Firm* — The Marbury Law Group PLLC

(57) ABSTRACT

A set of N standard bin count distributions may be generated by irradiating a test radiation detector system with an X-ray beam attenuated by a respective one of N different K-edge filters for each of the at least one X-ray source energy setting. Energy bins of detectors of a target radiation detector system may be calibrated by generating measured bin count distributions for each calibration setting in which a respective one of the N different K-edge filters attenuates a source X-ray beam. Calibration parameters of the detectors of the target radiation detector system may be adjusted to match each of the measured bin count distributions to a corresponding standard bin count distribution. In addition, energy resolution of the radiation detectors can be measured and calibrated by fitting a portion of the measured X-ray spectrum near a K-edge to a fitting function.

11 Claims, 22 Drawing Sheets

(56) References Cited

U.S. PATENT DOCUMENTS

| | | | |
|---|---|---|---|
| 6,362,482 B1 | 3/2002 | Stettner et al. | |
| 6,597,630 B1 | 7/2003 | Kubo et al. | |
| 8,476,594 B2 | 7/2013 | Frach et al. | |
| 8,564,084 B2 | 10/2013 | Vogtmeier et al. | |
| 8,716,652 B2 | 5/2014 | Hannemann et al. | |
| 9,847,369 B2 | 12/2017 | El-Hanany et al. | |
| 2002/0037068 A1 | 3/2002 | Oikawa | |
| 2004/0239377 A1* | 12/2004 | Tumer | G01T 1/17 327/94 |
| 2005/0167606 A1 | 8/2005 | Harrison et al. | |
| 2006/0118730 A1 | 6/2006 | Hefetz et al. | |
| 2007/0007457 A1 | 1/2007 | Blevis | |
| 2007/0120062 A1 | 5/2007 | Li et al. | |
| 2007/0121781 A1 | 5/2007 | Meirav et al. | |
| 2008/0165921 A1 | 7/2008 | Tkaczyk et al. | |
| 2010/0009821 A1 | 4/2010 | Hackenschmied et al. | |
| 2010/0213353 A1 | 8/2010 | Dierickx | |
| 2011/0155918 A1 | 6/2011 | Bouhnik et al. | |
| 2011/0211668 A1 | 9/2011 | Booker et al. | |
| 2011/0260072 A1 | 10/2011 | Guerin et al. | |
| 2012/0051499 A1* | 3/2012 | Lee | A61B 6/032 378/16 |
| 2012/0069954 A1 | 3/2012 | Iso et al. | |
| 2012/0087463 A1* | 4/2012 | Greenberg | G01T 1/29 378/5 |
| 2013/0214144 A1 | 8/2013 | Hannemann et al. | |
| 2013/0308848 A1* | 11/2013 | Proksa | G01N 23/04 382/131 |
| 2014/0183371 A1 | 7/2014 | Roessl et al. | |
| 2014/0341333 A1 | 11/2014 | Wang et al. | |
| 2015/0131776 A1 | 5/2015 | Cho | |
| 2015/0146849 A1* | 5/2015 | Kang | G01N 23/087 378/62 |
| 2015/0185333 A1 | 7/2015 | Cho | |
| 2015/0234059 A1 | 8/2015 | Roessl et al. | |
| 2015/0243022 A1 | 8/2015 | Petschke et al. | |
| 2015/0250444 A1* | 9/2015 | Tamura | A61B 6/585 378/19 |
| 2016/0093665 A1 | 3/2016 | Schubert et al. | |
| 2016/0240584 A1 | 8/2016 | El-Hanany et al. | |
| 2016/0282505 A1 | 9/2016 | Lee et al. | |
| 2016/0296184 A1 | 10/2016 | Rodrigues et al. | |
| 2017/0016998 A1 | 1/2017 | Shahar et al. | |
| 2017/0258412 A1* | 9/2017 | Daerr | A61B 6/06 |
| 2017/0290555 A1 | 10/2017 | Iniewski et al. | |
| 2017/0322319 A1 | 11/2017 | Iniewski et al. | |
| 2018/0042562 A1* | 2/2018 | Danielsson | G01T 1/17 |

OTHER PUBLICATIONS

Hu, H. et al., "Four Multidetector-Row Helical CT: Image Quality and vol. Coverage Speed," Radiology, vol. 215, No. 1, pp. 55-62, (2000).

Chmeissani, M et al., "First Experimental Tests with a CdTe Photon Counting Pixel Detector Hybridized with a Medipix2 Readout Chip," IEEE Transactions on Nuclear Science, vol. 51, No. 5, pp. 2379-2385, (2004).

Shikhaliev, PM. et al., "Tilted Angle CZT Detector for Photon Counting/Energy Weighting X-ray and CT Imaging," Phys Med Biol., vol. 51, No. 17, pp. 4267-4287, (2006).

Iniewski, K. et al., "CZT Growth, Characterization, Fabrication, and Electronics for Operation at >100 Mcps/mm$^{2}$," Workshop on Medical Applications of Spectroscopic X-Ray Detectors, CERN, 1 page, (2015).

Murphy, D.T et al., "Technical Advancements in Dual Energy," Published in P.M. Carrascosa et al. (eds.), Dual-Energy CT in Cardiovascular Imaging, Springer International Publishing, Switzerland, pp. 151-152, (2015).

Taguchi, K. et al., "An Analytical Model of the Effects of Pulse Pileup on the Energy Spectrum Recorded by Energy Resolved Photon Counting X-ray Detectors," Medical Physics, vol. 37, No. 8, pp. 3957-3969, (2010).

Koenig, T et al., "The New Medipix3 RX with CdTe Sensors: How Charge Summing Copes with Characteristic X-Rays and High Photon Fluxes," Karlsruhe Institute of Technology, pp. 1-19, (2013).

Kalemci, E. et al., "Investigation of charge sharing among electrode strips for a CdZnTe detector," Center for Astrophysics and Space Sciences, University of California, San Diego, California, pp. 1-16, (2013).

Hamel, L.A et al., "Optimization of Single-Sided Charge-Sharing Strip Detectors," Hamel IEEE, pp. 1-3, (2006).

Oonuki, K et al., "Development of Uniform CdTe Pixel Detectors Based on Caltech ASIC," aInstitute of Space and Astronautical Science (ISAS/JAXA), Sagamihara, Kanagawa 229-8510, Japan; Department of Physics, University of Tokyo, Bunkyo, Tokyo 113-0033, Japan; and Department of Physics, California Institute of Technology, Pasadena, CA 91125, USA, 11 pages, (2004).

Spieler, H., "Analog and Digital Electronics for Detectors," Physics Division, Lawrence Berkeley National Laboratory, Berkeley, California, pp. 1-43, (2003).

Murphy, D. T et al., "Technical Advancements in Dual Energy," Department of Radiology, St. Paul's Hospital, Springer International Publishing Switzerland, pp. 151-172, (2015).

Taguchi, K. et al. "Vision 20/20: Single photon counting x-ray detectors in medical imaging," Med. Phys., vol. 40, No. 10, 37 pages, (2013).

Polster, C. et al., "Improving material separation of high-flux whole-body photon counting computed tomography by K-edge pre-filtration," ABSTRACT, Proc. SPIE 10132, Medical Imaging 2017: Physics of Medical Imaging, 101320W (Mar. 9, 2017).

Roessl, E. et al., "K-edge imaging in x-ray computed tomography using multi-bin photon counting detectors," ABSTRACT, Phys Med Biol., vol. 52, No. 15, (2007).

Steadman, R. et al., "ChromAIX: fast photon-counting ASIC for spectral computed tomography," ABSTRACT, Nucl. Instrum. Methods Phys. Res. Sect. A: Accel. Spectrometers Detect. Assoc.Equip., vol. 648, Supp. 1, (2011).

Steadman, R. et al., "ChromAIX2: A large area, high count-rate energy-resolving photon counting ASIC for a Spectral CT Prototype," ABSTRACTR, Nuclear Instruments and Methods in Physics Research, vol. 862, (2017).

Atak, H. et al., "Photon counting x-ray imaging with K-edge filtered x-rays: A simulation study," Medical Physics, vol. 43, 1385 (2016).

* cited by examiner

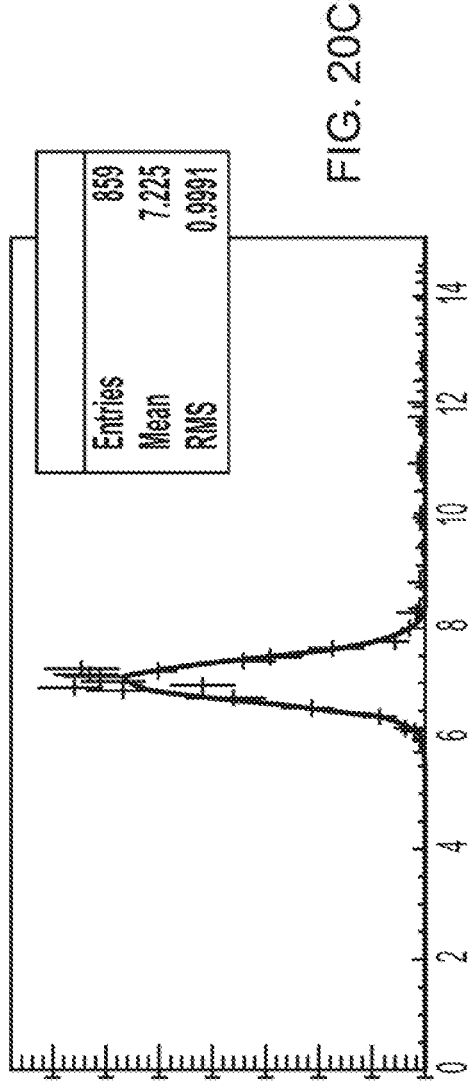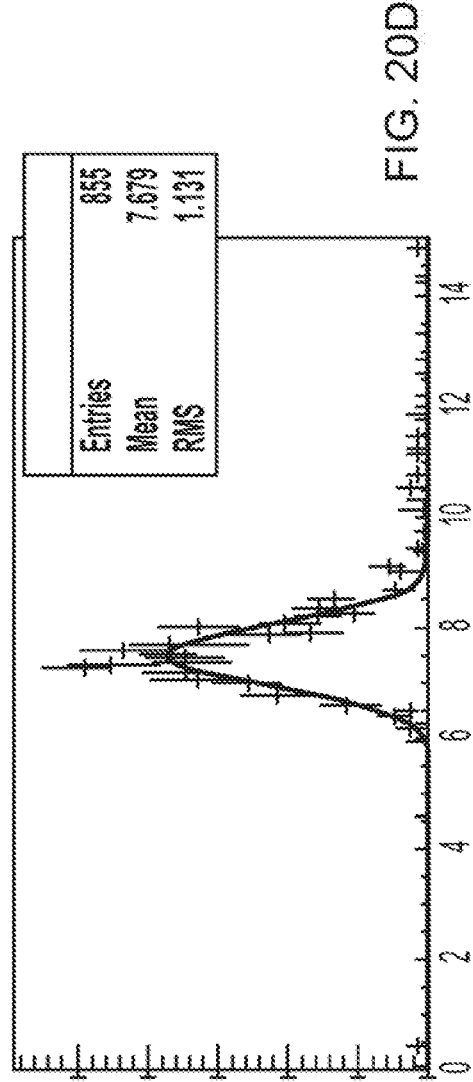

US 11,169,286 B2

METHODS OF CALIBRATING SEMICONDUCTOR RADIATION DETECTORS USING K-EDGE FILTERS

RELATED APPLICATIONS

This application claims the benefit of priority to U.S. Provisional Application No. 62/686,250, entitled "METHODS OF CALIBRATING SEMICONDUCTOR RADIATION DETECTORS USING K-EDGE FILTERS" filed Jun. 18, 2018, the entire contents of which are hereby incorporated by reference.

FIELD

The present application relates generally to radiation detectors, and more specifically to a method of testing radiation detectors using K-edge filters.

BACKGROUND

In computed tomography (CT) imaging systems, an X-ray source emits a fan-shaped beam toward an object, which may be, for example, a piece of baggage at an airport scanner or a patient in a medical diagnostic clinic, or any other biological or non-biological object under imaging. The X-ray beam is attenuated by the object, and is subsequently detected by a detector element, such as a cadmium zinc telluride (CdZnTe, or CZT) detector. Other direct conversion detectors employing cadmium telluride (CdTe), gallium arsenide (GaAs), or silicon (Si), or any indirect director based on a scintillator material, may also be used in CT imaging systems. Image slices collected by scanning the object can, when joined together, reconstruct 3-dimensional cross-section images of the object.

In typical CT imaging systems, a detector array that includes a number of detector elements may each produce a dedicated electrical signal that indicates the level of attenuation received by each detector element. The electrical signals may be transmitted to a data processing card for analysis. Finally, using image reconstruction techniques, a reconstruction image may be produced. The intensity of the attenuated beam received by each detector element is dependent upon the attenuation of the X-ray beam by the object. For example, when scanning a human body, bone turns up white, air turns up black, and tissues and mucous turn up in shades of gray.

SUMMARY

Various embodiments of the present disclosure provide a method of calibrating X-ray imaging modules of a CT system employing a set of K-edge filters and an X-ray source, which may be the X-ray source within the CT system.

According to an embodiment of the present disclosure, a method of calibrating a radiation detector system including a plurality of energy bins per each detector is provided. The method may include the steps of: generating a set of N standard bin count distributions by irradiating a test radiation detector system with an X-ray beam attenuated by a respective one of N different K-edge filters for each of at least one X-ray source energy setting; and calibrating energy bins of detectors of a target radiation detector system by generating measured bin count distributions for each calibration setting in which a respective one of the N different K-edge filters attenuates a source X-ray beam. Calibration parameters of the detectors of the target radiation detector system may be adjusted to match each of the measured bin count distributions to a corresponding standard bin count distribution generated with a same one of the N different K-edge filters and a same X-ray source energy setting.

According to another embodiment of the present disclosure, a method of measuring an energy resolution of an X-ray radiation detector is provided that includes placing a K-edge filter between an X-ray source and an X-ray radiation detector, measuring an X-ray spectrum with the K-edge filter in a beam path between the X-ray source and the X-ray radiation detector, locating at least two points for fitting a region of the measured X-ray spectrum near a K-edge energy of the K-edge filter in the measured X-ray spectrum, and determining an energy resolution of the X-ray radiation detector by fitting the at least two points to a fitting function that correlates a parameter of the fitting function to a calculated energy resolution.

BRIEF DESCRIPTION OF THE DRAWINGS

The accompanying drawings are presented to aid in the description of embodiments of the disclosure and are provided solely for illustration of the embodiments and not limitation thereof.

FIG. 20C shows the distribution of measured energy resolution employing a 1.9 mm thick Pb K-edge filter according to an embodiment of the present disclosure under a second capacitor value setting (of 11 fF) for the X-ray detector array.

FIG. 20D shows the distribution of measured energy resolution employing $Am^{241}$ as a radioactive X-ray source under the second capacitor value setting.

DETAILED DESCRIPTION

Figure 1:
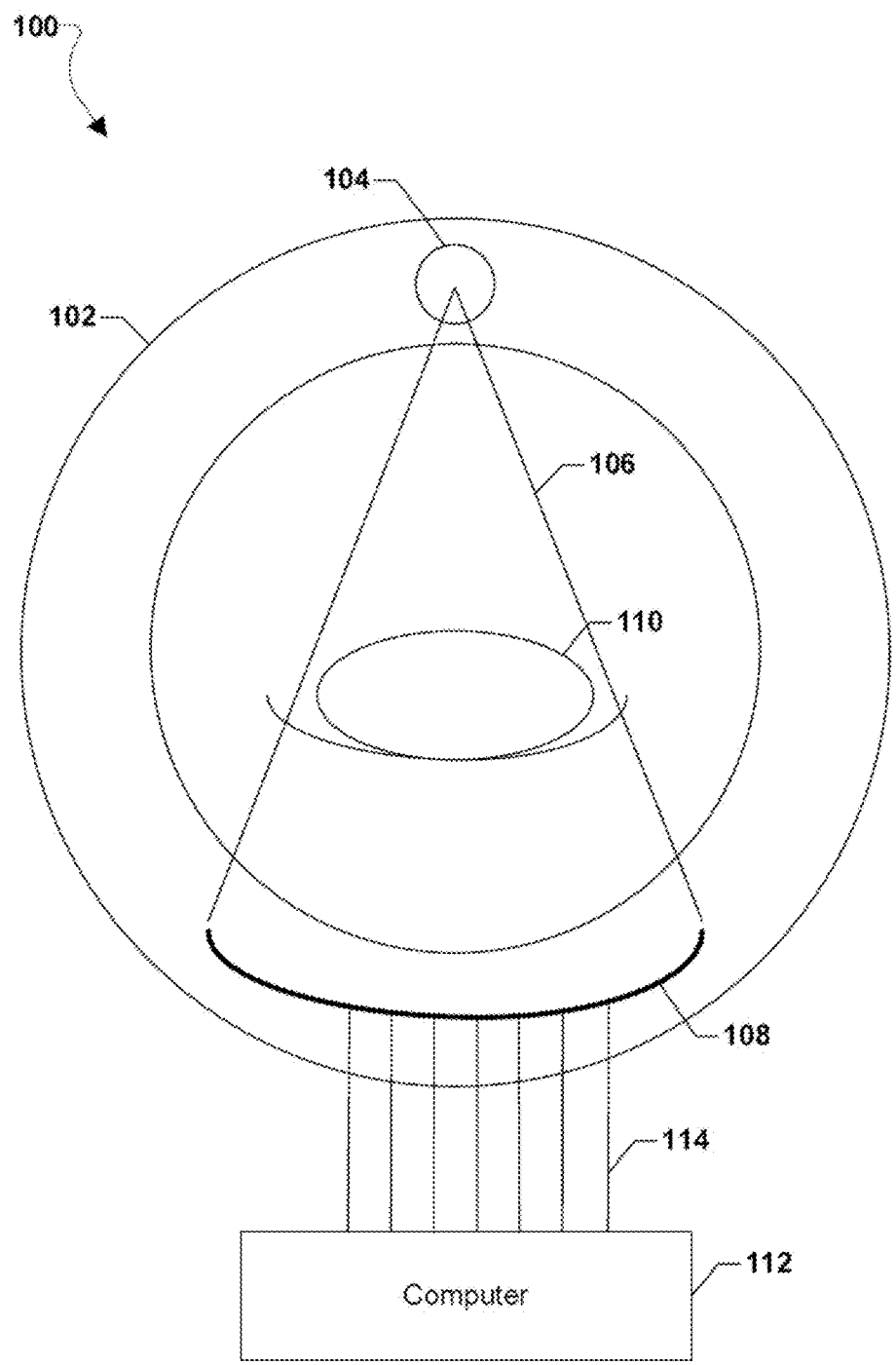
FIG. 1 is a functional block diagram of a computed tomography (CT) imaging system that may be calibrated employing the methods of the present disclosure.

As discussed above, the present disclosure is directed to high voltage (HV) connection methods to the cathodes of cadmium zinc telluride or other radiation detectors, the various embodiments of which are described herein with reference to the drawings.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

In computed tomography (CT) imaging systems, a scanned object is exposed to an X-ray beam. Attenuated photons from the X-ray beam are detected by a detector array. When an object is loaded in a CT imaging system, the X-ray beam may be heavily attenuated, and the number of photons detected by the detector array may be orders of magnitude less than the number of photons emitted from an X-ray source. For image reconstruction purposes, the detector array can be exposed to a direct X-ray beam without an intervening object located inside the CT imaging system. In such cases, the photon count rates in the CT imaging system may reach values of 100 million counts per second per square millimeter (Mcps/mm$^2$) or more. The detector array may be capable of detecting such a wide range of photon count rates.

Testing of fabricated semiconductor sensors for use in CT imaging systems, like those made out of CdZnTe and their corresponding imaging modules, remains a challenge and can be a very time-consuming process. The challenges associated with testing such semiconductor sensors increases the manufacturing cost of the sensors and CT imaging system detector modules, and reduces the availability of CT imaging systems during usage due to frequent calibration requirements.

In the past, calibration of semiconductors sensors, such as those made of CdZnTe and their corresponding imaging modules, required use of multiple radioactive isotope sources. For example, a combination of americium ($^{241}$Am), which emits gamma rays at 59.5 keV, and cobalt ($^{57}$Co), which mostly emits gamma rays at 122 keV, can be employed as a pair of radiation sources emitting particles of different energies. Use of two energy sources providing known energies enables calibration of detectors by establishing a correlation between internal arbitrary units (AUs) into photon energy expressed in keV.

Availability of radioactive isotope sources is limited, and the use of radioactive isotope sources requires special safety considerations. As a result, even large medical facilities do not typically store radioactive isotope sources on site. Thus, calibration of imaging modules typically requires shipping the modules to off-site specialized facilities. Therefore, it is desirable to provide a calibration technique for semiconductor X-ray imaging modules that does not require use of radioactive isotope sources.

FIG. 1 is a functional block diagram of a CT imaging system 100 suitable for use implementing various embodiment methods. The CT imaging system 100 may include a gantry 102, which may include a moving part, such as a circular, rotating frame with an X-ray source 104 mounted on one side and a curved detector array 108 mounted on the other side. The gantry 102 may also include a stationary (i.e., non-moving) part, such as a support, legs, mounting frame, etc., which rests on the floor and supports the moving part. The X-ray source 104 may emit a fan-shaped X-ray beam 106 as the gantry 102 and the X-ray source 104 rotates around an object 110 inside the CT imaging system 100. The object 110 may be any biological (e.g., human patient) or non-biological sample to be scanned. After the X-ray beam 106 is attenuated by the object 110, the X-ray beam 106 is received by the detector array 108. The curved shape of the detector array 108 allows the CT imaging system 100 to create a 360° continuous circular ring of the image of the object 110 by rotating the gantry 102 around the object 110.

For each complete rotation of the gantry 102, one cross-sectional slice of the object 110 is acquired. As the gantry 102 continues to rotate, the detector array 108 takes numerous snapshots called "view". Typically, about 1,000 profiles are taken in one rotation of the gantry 102. The object 110 may slowly pass through the rotating gantry 102 so that the detector array 108 captures incremental cross-sectional profiles of the entire object 110. Alternatively, the object 110 may remain stationary and the gantry 102 is moved along the length of the object 110 as the gantry 102 is rotated. The data generated by the detector array 108 is passed to a computer 112 that may be located remotely from the gantry 102 via a connection 114. The connection 114 may be any type of wired or wireless connection. If the connection 114 is a wired connection, the connection 114 can include a slip ring electrical connection between the rotating part of the gantry 102 supporting the detector 108 and a stationary support part of the gantry 102 which supports the rotating part (e.g., the rotating ring). If the connection 114 is a wireless connection, the detector 108 mounted on the rotating part of the gantry 102 may contain any suitable wireless transceiver to communicate data with another wireless transceiver that is not located on the rotating part of the gantry 102 and which is in communication with the computer 112. The computer 112 may include processing and imaging applications that analyze each profile obtained by the detector array 108, and the full set of profiles from each rotation is compiled to form a two-dimensional image of a cross-sectional slice of the object 110.

Various alternatives to the design of the CT imaging system 100 of FIG. 1 may be employed to practice embodiments of the present disclosure. CT imaging systems may be designed in various architectures and configurations. For example, a CT imaging system may have a helical architecture. In a helical CT imaging scanner, the X-ray source and detector array are attached to a freely rotating gantry. During a scan, a table moves the object smoothly through the scanner creating helical path traced out by the X-ray beam. Slip rings enable the transfer of power and data on and off the rotating gantry. A switched mode power supply may be used to power the X-ray source while at the same time still be small enough to be installed on the gantry.

In other embodiments, the CT imaging system may be a tomosynthesis CT imaging system. In a tomosynthesis CT scanner, the gantry may move in a limited rotation angle (e.g., between 15 degrees and 60 degrees) in order to detect a cross-sectional slice of the object. The tomosynthesis CT scanner may be able to acquire slices at different depths and with different thicknesses that may be constructed via image processing.

The detector array of a CT imaging system may include an array of radiation detector elements, such as pixel sensors. The signals from the pixel sensors may be processed by a pixel detector circuit, which may sort detected photons into energy bins based on the energy of each photon or the voltage generated by the received photon. When a photon is detected, its energy is determined and the photon count for its associated energy bin is incremented. For example, if the detected energy of a photon is 24 kilo-electron-volts (keV), the photon count for the energy bin of 20-40 keV may be incremented. The number of energy bins may range from one to several, such as two to six. In an illustrative example, a photon counting detector may have four energy bins: a first bin for detecting photons having an energy between 20 keV and 40 keV, a second bin for detecting photons having an energy between 40 keV and 60 keV, a third bin for detecting photons having an energy between 60 keV and 80 keV, and a fourth bin for detecting photons having an energy above 80 keV. The greater the total number of energy bins, the better the material discrimination.

Regardless of various embodiments of the CT imaging system, an image reconstruction task requires precise knowledge of the photon energies detected by radiation sensors. Such knowledge may be acquired at the time of system installation by performing extensive calibration techniques. This calibration procedure might require use of radioactive isotope X-ray sources such as $^{241}$Am and $^{57}$Co that emit precise energy photon energies. Alternatively, X-ray fluorescence signals can be utilized as described in U.S. Pat. No. 8,716,652 B2.

Due to equipment aging, temperature changes, or electronics drifts, calibration of a CT imaging system may have to be repeated on a regular basis. In some applications, daily calibration may be required. The percentage of time spent on system calibration is therefore critical to the overall operating cost for a CT equipment. Moreover, radiation sources may not be easily available, and set-up procedures for X-ray fluorescence measurements may be challenging due to the requirement for precise geometrical arrangements. Therefore, there is a need for a CT system calibration method that employs measurement of photon energies using the X-ray spectra only.

Figure 2:
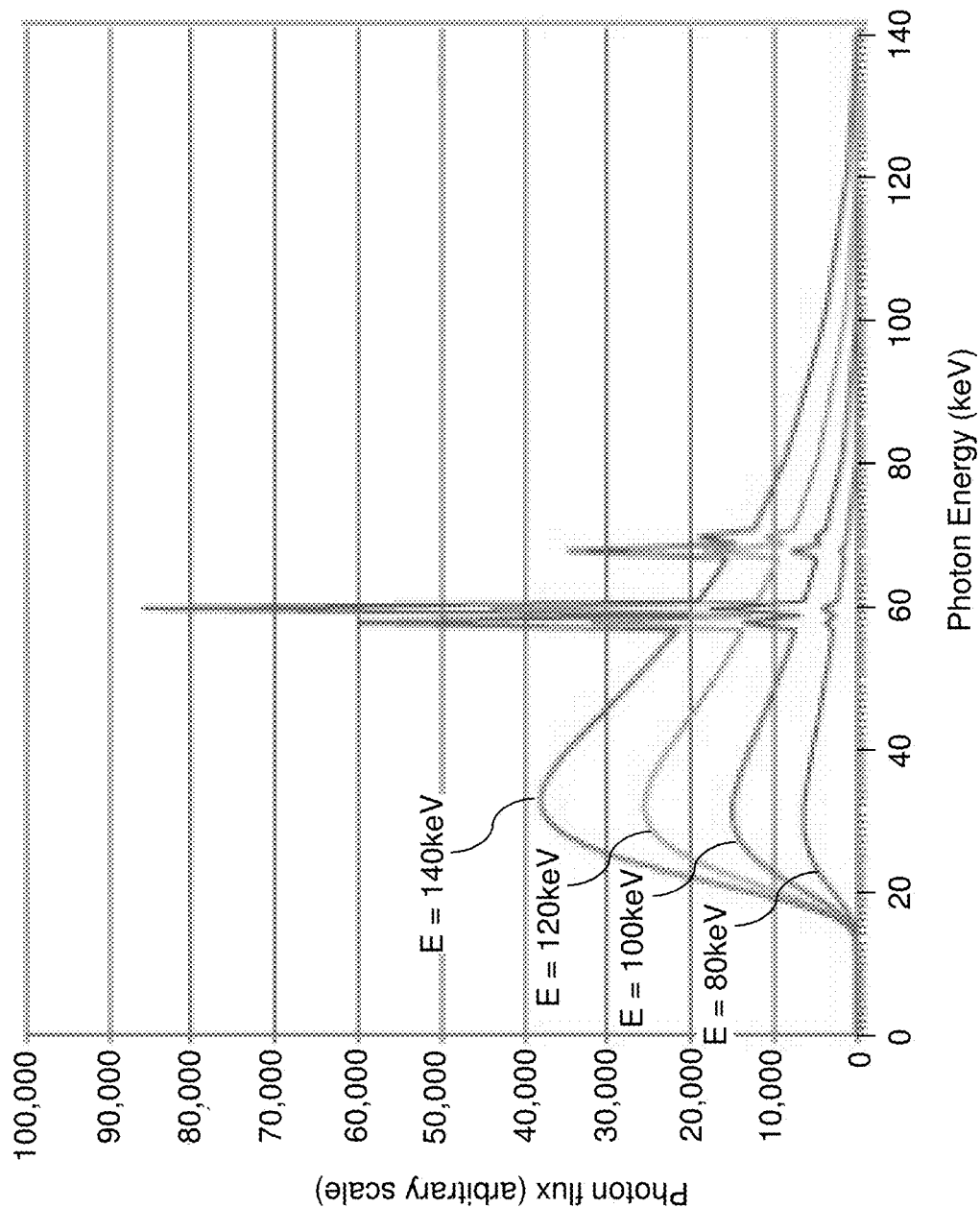
FIG. 2 is an illustration of transmitted X-ray spectra that includes characteristic peaks shown for X-ray source voltages of 80 kV, 100 kV, 120 kV, and 140 kV.
Figure 3:
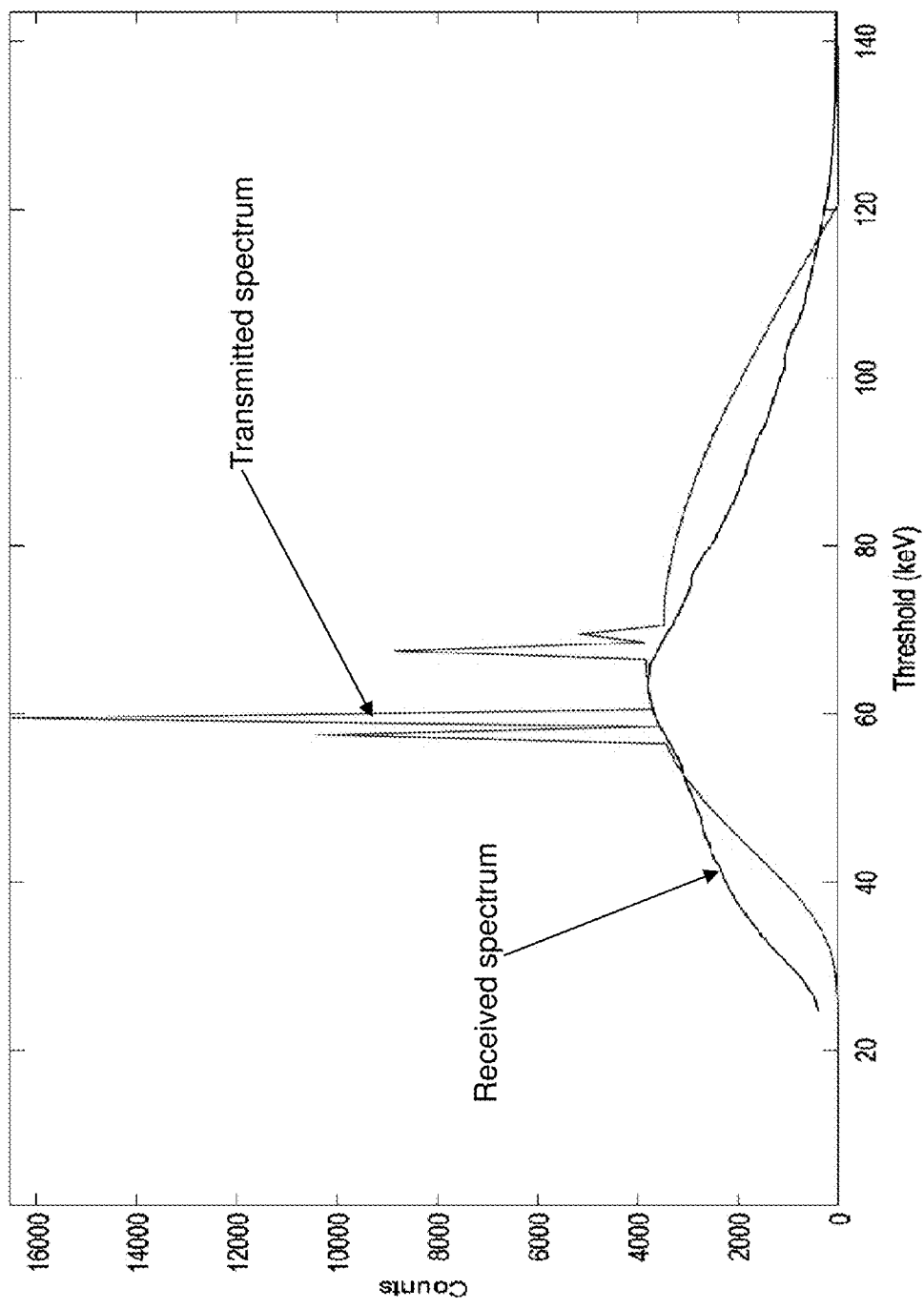
FIG. 3 is a comparison between a transmitted X-ray spectrum and a received X-ray spectrum at a detector.

The X-ray spectra generated from an X-ray tube in a CT system contain characteristic peaks at very well-defined energies as illustrated in FIG. 2. However, it is very difficult to use the characteristics peaks to calibrate the energy response of a detector. This is because the characteristic peaks are very narrow in the transmitted spectrum, and the finite energy resolution in the received X-ray spectra causes the characteristic peaks to be smeared out as illustrated in FIG. 3. In order to resolve the characteristics peaks illustrated in FIG. 2 in received X-ray spectra, the energy resolution of the detectors in a CT photon counting system need to be about 2-3 keV or less. While achieving such a low energy resolution in received X-ray spectra might be theoretically possible at low count rates that is typical for spectroscopic systems, even the best state-of-the-art high-count CT photon counting systems achieve a best energy resolution of about 6-8 keV. Thus, for all practical purposes, the current X-ray detection technology does not provide resolution that is sufficient to resolve characteristic peaks of transmitted X-ray spectra.

The present disclosure provides an alternative calibration method for calibrating detectors in a CT system without employing radioactive isotope X-ray sources or X-ray fluorescence signals except at the time of initial calibration of a test system and generation of at least one set of standard bin count distributions from the test system. According to an embodiment of the present disclosure, X-ray spectra may be modified employing "K-edge filters" and subsequently measured by detectors of the CT system.

Figure 4:
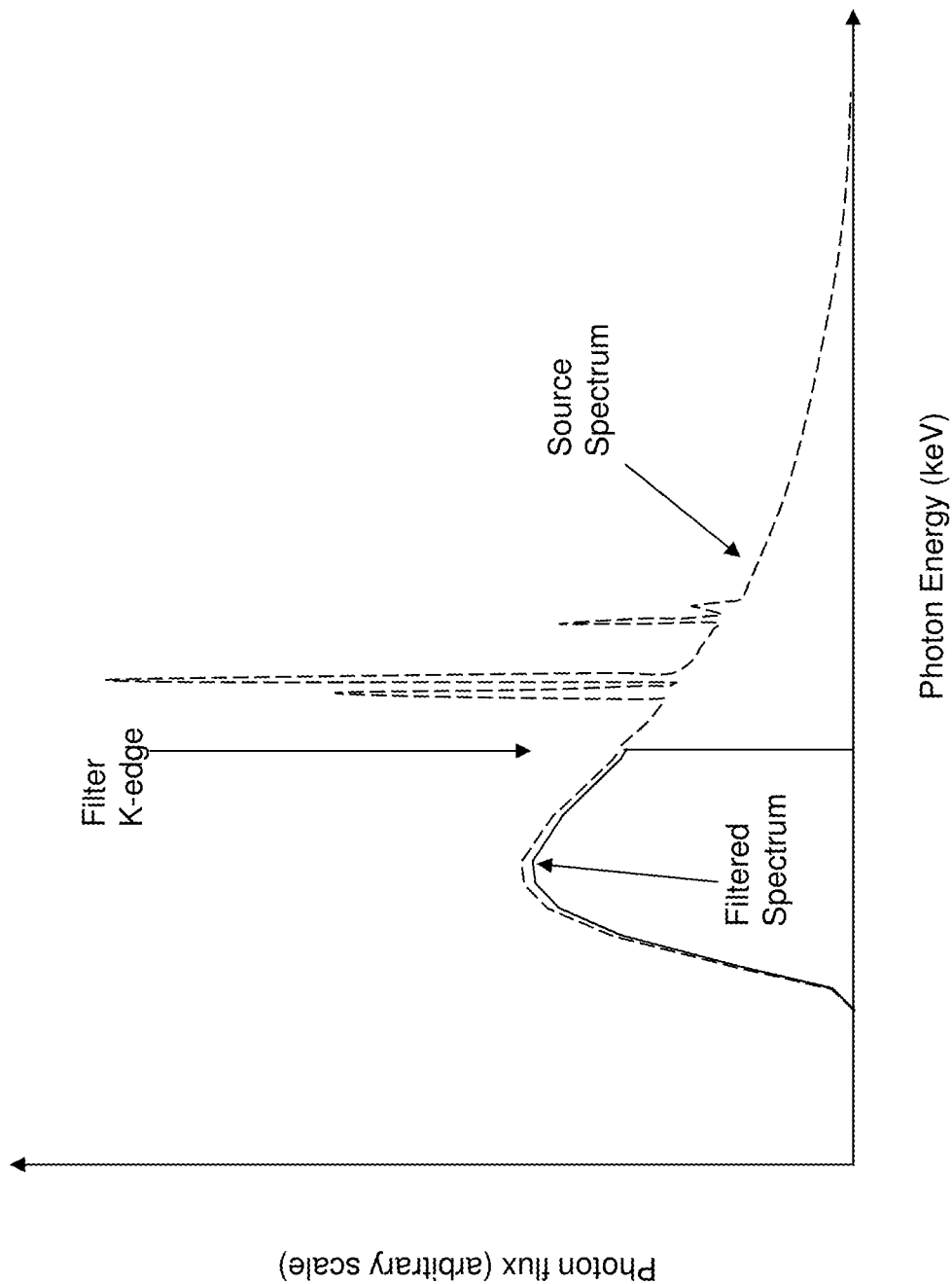
FIG. 4 is a schematic representation of a filtered spectrum obtained by passing an X-ray beam through an ideal K-edge filter.

The K-edge is the binding energy of the K shell electrons (i.e., innermost shell electrons) of an atom. The fraction of photons attenuated (referred to herein as the "attenuation coefficient") by an element as a function of the photon energy exhibits a sudden increase at the photon energy just above the binding energy of the K shell electrons. This sudden increase in the attenuation coefficient as a function of the photon energy is due to photoelectric absorption of the photons by the K shell electrons within the element. For this interaction to occur, the photons must have more energy than the binding energy of the K shell electrons (K-edge). This is because a photon having an energy just above the binding energy of the electron is significantly more likely to be absorbed than a photon having an energy just below this binding energy. A filter that takes advantage of this phenomenon is referred to herein as a "K-edge filter." An ideal K-edge filter absorbs all photons having an energy greater than the K-shell binding energy of an element, and does not absorb any photons having an energy less than the K-shell binding energy of the element as illustrated in FIG. 4.

Various materials can be used to create a K-edge filter in order to provide maximum benefits for the X-ray spectra calibration purposes. K-edge filters made with elements with atomic numbers from 56 to 71 can provide filtering at K-edge energies of 37.4-63.4 keV, which would be suitable for the calibration properties at the low end of the x-ray spectrum measured by detectors of the CT system. Elements with higher atomic number materials can be used for the higher end of the x-ray spectrum measured by detectors of the CT system.

Figure 5:
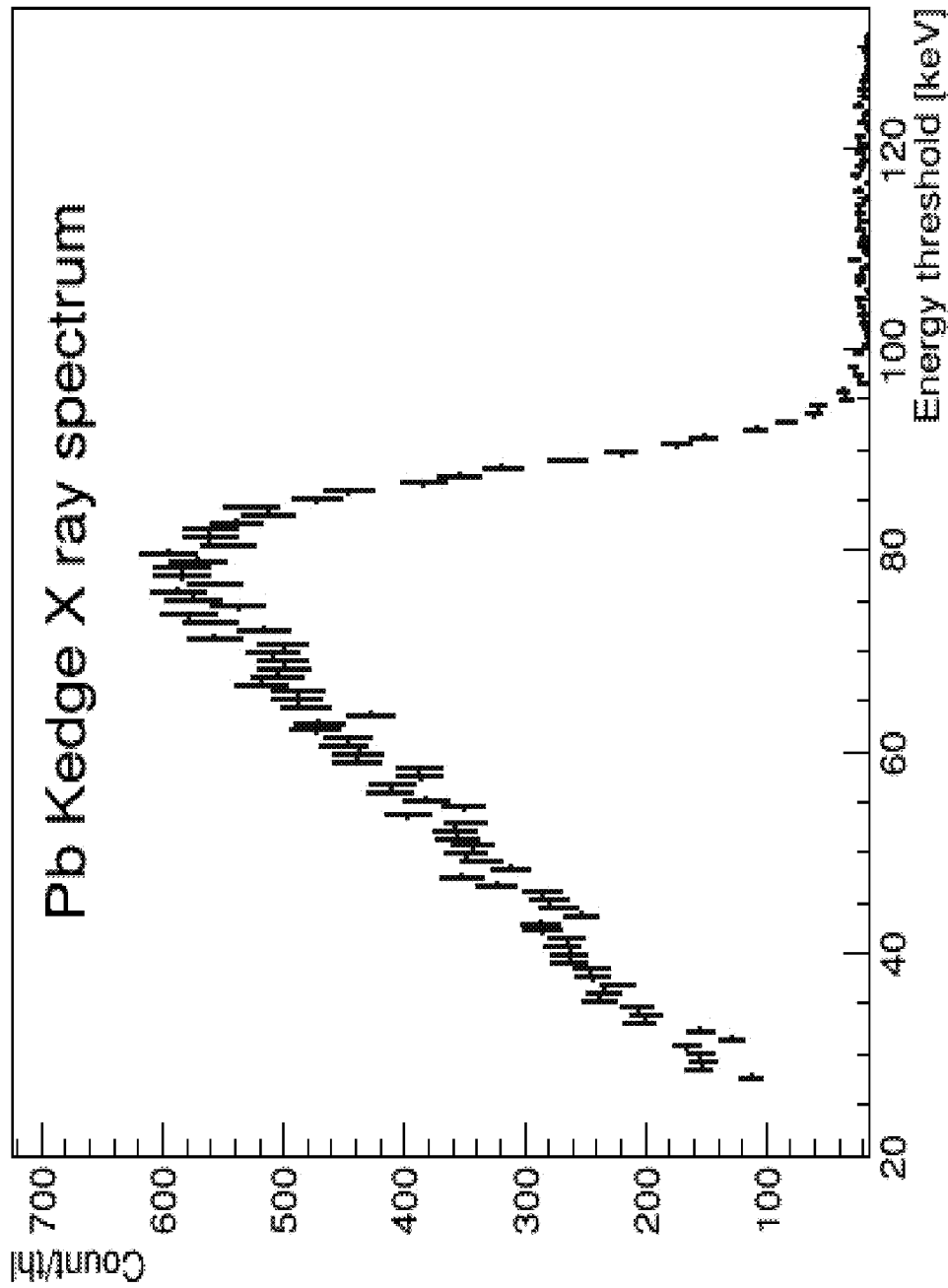
FIG. 5 is an example of measured X-ray spectra from an X-ray beam passing through a lead K-edge filter (with a K-edge at 88 keV).
Figure 6:
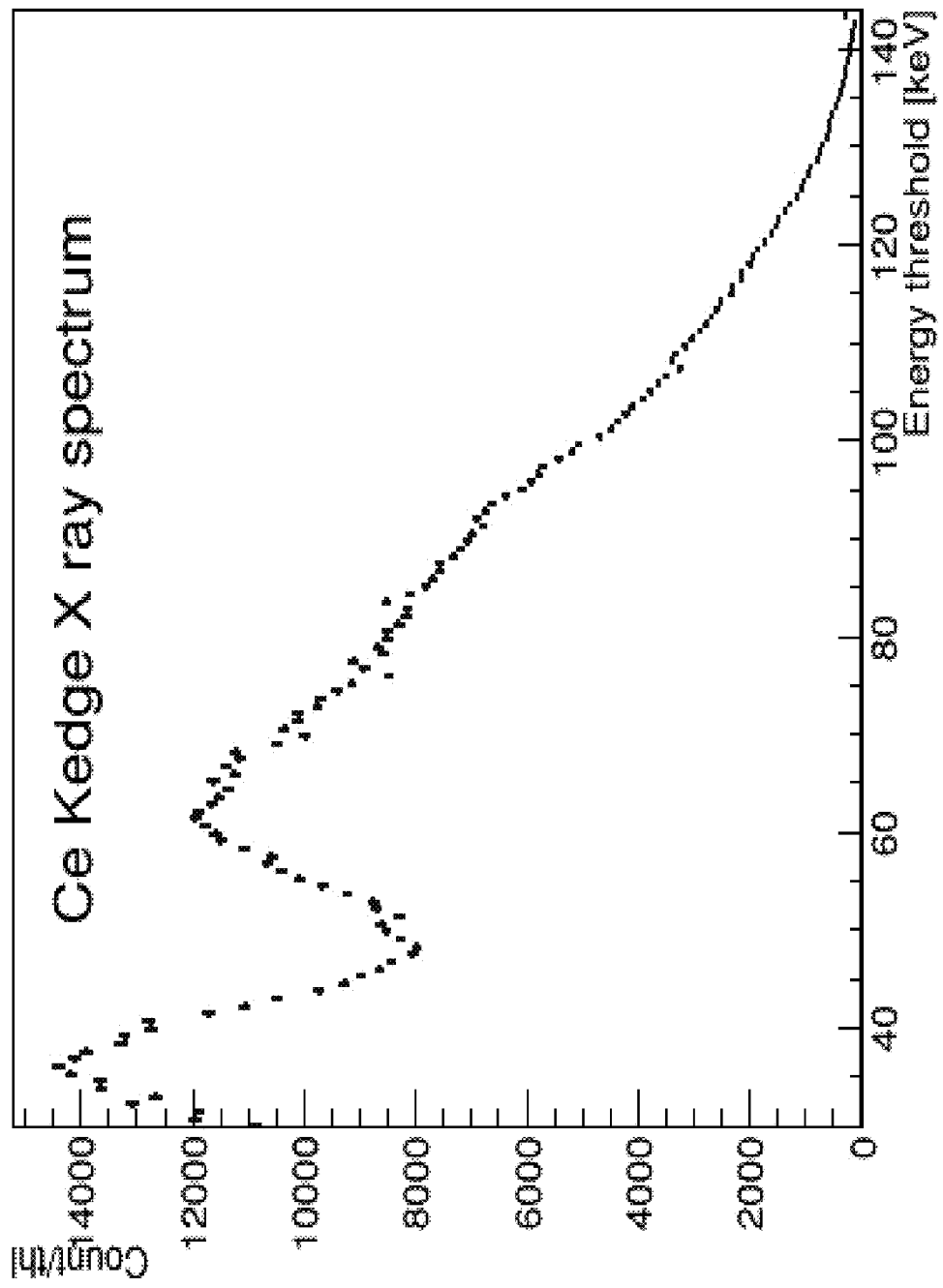
FIG. 6 is an example of measured X-ray spectra from an X-ray beam passing through a cerium oxide K-edge filter.

Physical K-edge filters display a less sharp cut-off characteristic in the received X-ray spectra. FIGS. 5 and 6 illustrate examples of measured X-ray spectra from an X-ray beam passing through a K-edge filter. FIG. 5 illustrates measured X-ray spectra from an X-ray beam passing through a lead (Pb) K-edge filter, which has a K-edge at 88 keV. The K-edge at 88 keV energy can be seen in the figure, while an X-ray spectrum peak is absent due to a high X-ray tube voltage used in this case (140 kV). FIG. 6 illustrates X-ray spectra from an X-ray beam passing through a cerium oxide ($CeO_2$) K-edge filter. The K-edge of cerium at 40 keV can be seen in the figure, while the spectrum includes a local peak around 65 keV.

According to an embodiment of the present disclosure, a plurality of K-edge filters is employed to perform energy calibration of detectors in a CT imaging system. The methods of the present disclosure may be implemented on a radiation detector system, which may include a sensor array of an X-ray tomography system.

Figure 7:
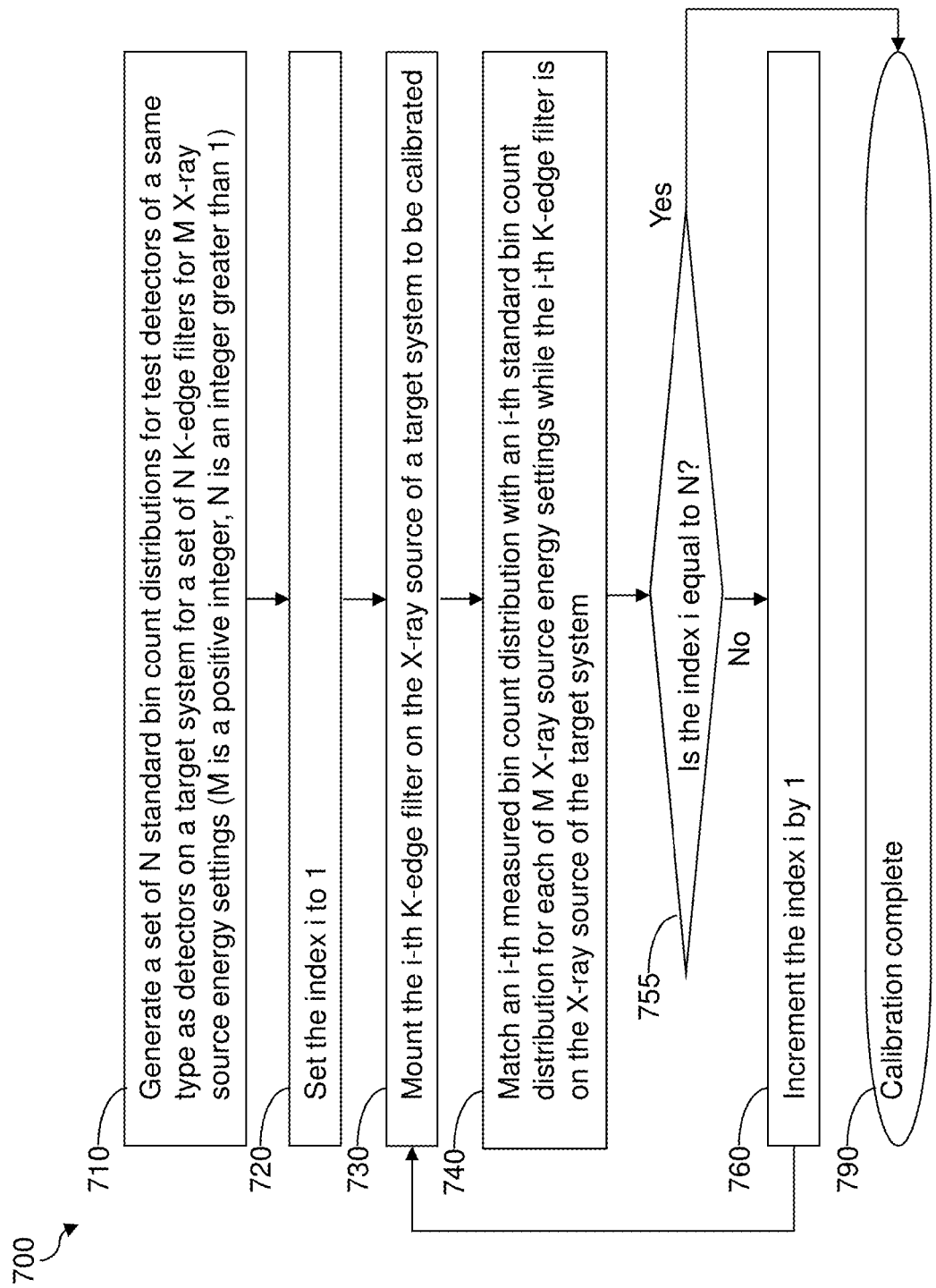
FIG. 7 is a flow diagram illustrating a method for calibrating detectors of a radiation detector system according to an embodiment of the present disclosure.

The flow diagram in FIG. 7 illustrates a method 700 of an exemplary set of the processing steps for calibrating detectors of a radiation detector system according to an embodiment of the present disclosure.

Referring to step 710 of the method 700, calibrated detectors of the same type as detectors on a target radiation detector system (herein referred to as a "target system") may be provided in a test radiation detector system (which can be a test CT imaging system). The calibrated detectors in the test radiation detector system are herein referred to as test detectors. The target system refers to the CT imaging system that needs to be subsequently calibrated. In other words, the accuracy of the detectors of the target system are not guaranteed at this point, and thus, the detectors of the target system are in need of calibration.

Each of the target system and the test radiation detector system may be an X-ray tomography system including a radiation detector system of the same type. The detectors of the radiation detector system may include a sensor array. For example, the detectors may include a radiation-sensitive material selected from cadmium zinc telluride, cadmium telluride, gallium arsenide, silicon, and a scintillator material. Each detector has a plurality of energy bins for recording detected photons. The total number of energy bins of each detector may be, for example, in a range from 2 to 64. When a detector detects a photon, a photon count may be incremented in the energy bin encompassing the detected photon's energy.

Calibration on the test detectors may be performed employing any known method in the prior art. For example, radioactive isotope X-ray sources such as $^{241}$Am and $^{57}$Co, or X-ray fluorescence signal methods as known in the art, may be employed to calibrate the test detectors. The test detectors may be of the same type as the detectors on the target system. Specifically, the detectors on the target system may be designed to operate in the same manner as the test detectors, and may be configured to have the same number of energy bins as the test detectors with matching energy ranges. Typically, the detectors on the target system and the test detectors are of the same model from a same manufacturer.

A plurality of K-edge filters, such as N different K-edge filters, may be employed to calibrate the detectors on the target system employing the calibrated detectors. N is a positive integer greater than 1. In other words, N may be an integer selected from 2, 3, 4, 5, 6, 7, 8, etc. Bin count distributions are generated for each setting in which a respective one of the N different K-edge filters is interposed between the X-ray source and the calibrated detectors. To simplify measurements, a K-edge filter may be the only intervening element between the X-ray source and the calibrated detectors. For each selection of a K-edge filter among the N K-edge filters and a fixed X-ray source energy setting (i.e., an X-ray tube voltage setting), a bin count distribution may be generated upon measurement of received X-ray spectrum by the calibrated detectors.

After a K-edge filter is replaced with another K-edge filter without changing the fixed X-ray source energy setting, another bin count distribution may be generated upon measurement of received X-ray spectrum by the calibrated detectors. By sequentially employing each of the N K-edge filters without changing the fixed X-ray source energy setting, a set of N bin count distributions may be generated from the calibrated detectors. The set of N bin count distributions generated from the calibrated detectors is the ideal set of N bin count distributions that any other calibrated detectors should replicate. Thus, the set of N bin count distributions generated from the calibrated detectors constitute a set of N standard bin count distributions. Each of the N standard bin count distributions represents an ideal bin count distribution that should be replicated in any properly calibrated detector if employed with a corresponding one of the N K-edge filters.

The generated set of N standard bin count distributions is for the fixed X-ray source energy setting. Changing the X-ray source energy setting, for example, from 140 keV to 120 keV, changes the spectra generated from the X-ray tube, changes the spectra generated by passing through each of the K-edge filters, and correspondingly changes the measured bin count distribution. Generally, M setting(s) for the X-ray source energy may be employed, in which M is a positive integer. In other words, M may be 1, 2, 3, 4, 5, etc.

In implementations in which M is greater than 1, the process of generating a set of N standard bin count distributions for the calibrated detectors may be repeated (M−1) times while the X-ray source energy is at a different setting (i.e., at a different X-ray tube voltage) compared to the initial setting that generated the first set of N standard bin count distributions. Thus, a respective set of N standard bin count distributions may be generated for each of the M setting(s) for the X-ray source energy. In some embodiments, the integer N may be in a range from 2 to 16, and the at least one X-ray source energy setting may include M X-ray source energy settings, in which M is an integer within a range from 1 to 8.

Generally, a set of N standard bin count distributions may be generated by irradiating a test radiation detector system with an X-ray beam attenuated by a respective one of N different K-edge filters for each of at least one X-ray source energy setting (i.e., M X-ray source energy setting(s) in which M is a positive integer). Generation of M sets of N standard bin count distributions may be performed employing a CT imaging system of a same type as the target system, i.e., a target CT imaging system to be subsequently calibrated. In some embodiments, the same CT imaging system may be employed to generate the M sets of N standard bin count distributions at one point in time as the target system, and the detectors of the target system may be calibrated at a later point in time, e.g., when the probability of drifts in the calibration of the detectors is not negligible. In another embodiment, the CT imaging system that is employed to generate the M sets of N standard bin count distributions may be a different CT imaging system from the target system but of a same type. For example, the CT imaging system that is employed to generate the M sets of N standard bin count distributions may be capable of generating the same X-ray spectra under each given X-ray source voltage setting as the target system.

In some embodiments, each set of N standard bin count distributions corresponding to a respective one of the at least one X-ray source energy setting may be generated by calibrating detectors on a test radiation detector system employing X-ray sources (such as $^{241}$Am and $^{57}$Co) of known energy and intensity, and generating each set of N standard bin count distribution by measuring a response of the test radiation detector system while N test K-edge filters having same attenuation characteristics as the N different K-edge filters are sequentially disposed one by one in an X-ray beam path of the test radiation detector system. In some embodiments, the X-ray sources of known energy and intensity may include at least two radioactive isotope materials of a respective known quantity.

Figure 8:
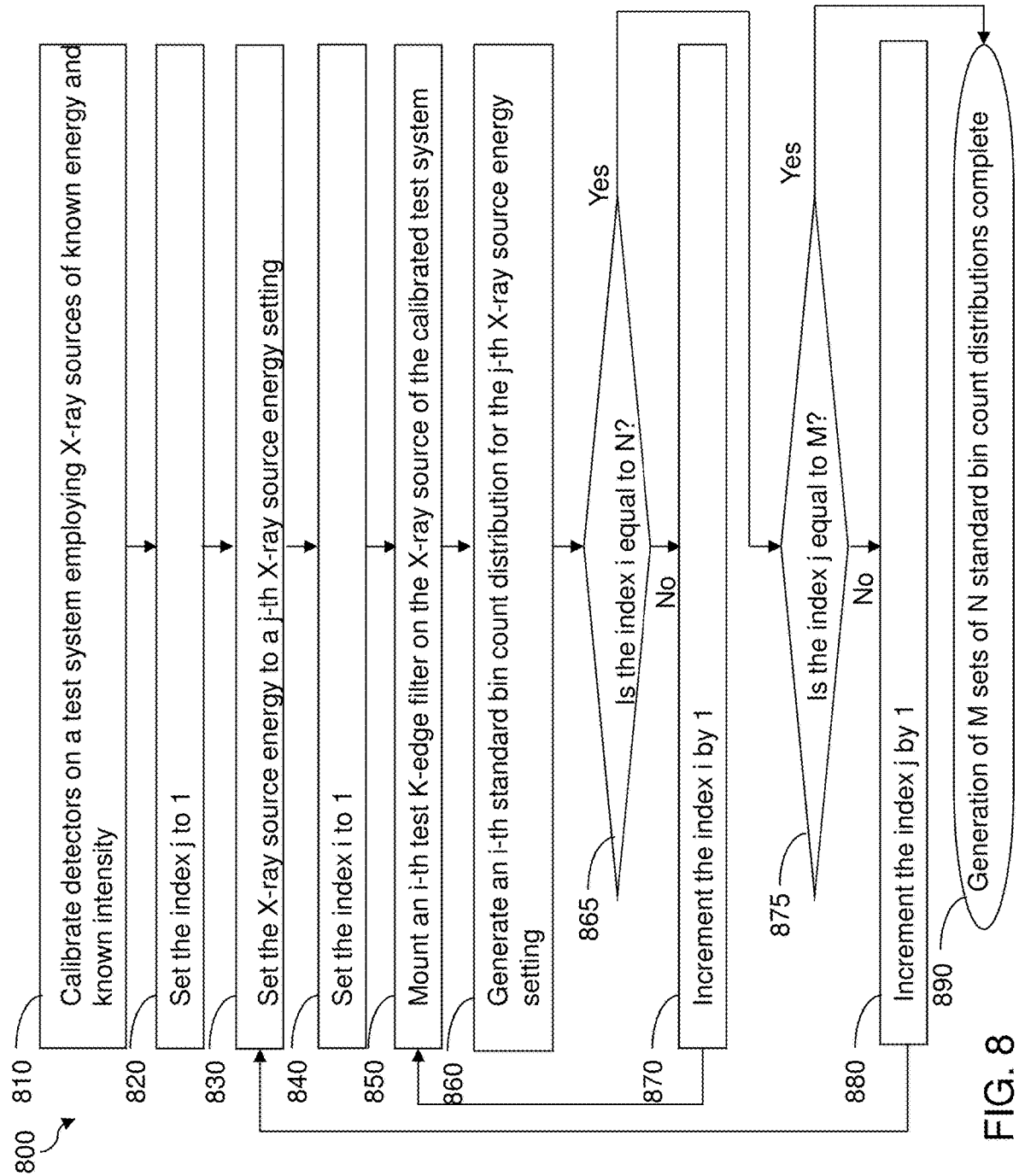
FIG. 8 is a flow diagram illustrating a method for generating at least one set of standard bin count distributions according to an embodiment of the present disclosure.

The flow diagram in FIG. 8 illustrates a method 800 of processing steps for implementing step 710 of the method 700, i.e., detailed processing steps for generating at least one set of standard bin count distributions described above.

Referring to step 810 of the method 800, the detectors on the test system may be calibrated employing X-ray sources of known energy and known intensity as described above.

Referring to step 820 of the method 800, a counting index j for the X-ray source index setting may be set to 1.

Referring to step 830 of the method 800, the X-ray source energy of the test system is set to the j-th setting among the M settings for the X-ray source energy, which is the first setting when the counting index j is set to 1.

Referring to step 840 of the method 800, a counting index i for a selected K-edge filter is set to 1.

Referring to step 850 of the method 800, an i-th test K-edge filter is mounted onto the test system, e.g., on the X-ray source of the test system (that is previously calibrated at step 810. When the counting index i is set to 1, the first test K-edge filter is mounted onto the test system. Each test K-edge filter among the N test K-edge filters can be the same filter, or of the same type, as the corresponding K-edge filter within a set of N K-edge filters to be subsequently employed calibrate the target system. In other words, each test K-edge filter provides the same filtering characteristics as the corresponding K-edge filter among the set of N K-edge filters to be subsequently used to calibrate the target system by being the same, or by being of the same type.

Referring to step 860, an i-th standard bin count distribution for the j-th X-ray source energy setting may be generated. Because the test system is already calibrated at step 810, the measured bin count distribution from the detectors of the test system may be the i-th standard bin count distribution for the j-th X-ray source energy setting (upon proper normalization that divides the measured counts in each bin by the duration of the X-ray beam irradiation).

Referring to step 865, the counting index i may be compared with the total number N of K-edge filters. If the value of the counting index i is less than N, the value of i is incremented by 1 in step 870, the next (i.e., i-th) test K-edge filter is mounted onto the test system in step 850, and i-th standard bin count distribution for the j-th X-ray source energy setting may be generated in step 860 as described above. Upon N iterations of steps 850 and 860, a set of N standard bin count distributions corresponding to N different K-edge filters and the selected X-ray source energy setting (i.e., the j-th X-ray source energy setting) is generated.

Upon the N-th iteration of step 865 for the given value of the counting index j, the index i is equal to N, and the method proceeds to step 875.

At step 875, the value of the counting index j is compared with the value of M, i.e., the total number of X-ray source energy settings to be employed, which is the same as the total number of sets of N standard bin count distributions to be generated. If the counting index j is less than the value of M, the counting index j is incremented by 1 in step 880, the method returns to step 830 to set the X-ray source energy to the new j-th source energy setting. Upon M iterations of steps 830-875, M sets of N standard bin count distributions corresponding to N different K-edge filters and M different X-ray source energy setting(s) will be generated. Upon the M-th iteration of step 875, the index j is equal to M, and the generation of the M sets of N standard bin count distributions is complete in step 890.

Generally, at least one X-ray source energy setting may be employed, which may include M X-ray source energy settings. M is an integer greater than 1. M standard bin count distributions are generated for each of the N test K-edge filters disposed in the X-ray beam path with change of a source energy of the X-ray beam through each of the M X-ray source energy settings.

Optionally, an additional standard bin count distribution (i.e., an (M+1)-th standard bin count distribution) may be generated by measuring a response of the test radiation detector system without any test K-edge filter in the X-ray beam path of the test radiation detector system for each of the at least one X-ray source energy setting. In this embodiment, the energy bins of detectors of the target radiation detector system may be calibrated by matching an additional measured bin count distribution for a setting in which the source X-ray beam is not attenuated by any K-edge filter to the additional standard bin count distribution at a corresponding X-ray source energy setting.

Referring to steps 720-790 of the method 700 illustrated in FIG. 7, energy bins of detectors of the target radiation detector system may be calibrated by generating measured bin count distributions for each of the M calibration setting(s) in which a respective one of the N different K-edge filters attenuates a source X-ray beam. The target radiation detector system (i.e., the target system) may be the same as, or may be different from, the test radiation detector system (i.e., the test system). In some embodiments, the test radiation detector system is a different system from the radiation detector system that is calibrated (i.e., the target system). In other embodiments, the test radiation detector system is the same system as the radiation detector system that is calibrated, and calibrating of the radiation detector system is performed at least one day after generating the set of N standard bin count distributions for each of at least one X-ray source energy setting.

Referring to step 720, the counting index i for the N K-edge filters is set to 1.

Referring to step 730, the i-th K-edge filter is mounted to the target system. As discussed above, the i-th K-edge filter may be the same as, or may be of the same type as, the i-th test K-edge filter employed at step 850 of the method 800.

Referring to step 740, bin count distributions may be measured as the setting for the X-ray source energy is sequentially changed from the first X-ray source energy setting to the M-th X-ray source energy setting. Calibration parameters of the detectors of the target radiation detector system may be adjusted to match each of the measured bin count distributions to a corresponding standard bin count distribution generated with a same one of the N different K-edge filters and a same X-ray source energy setting.

Figure 9:
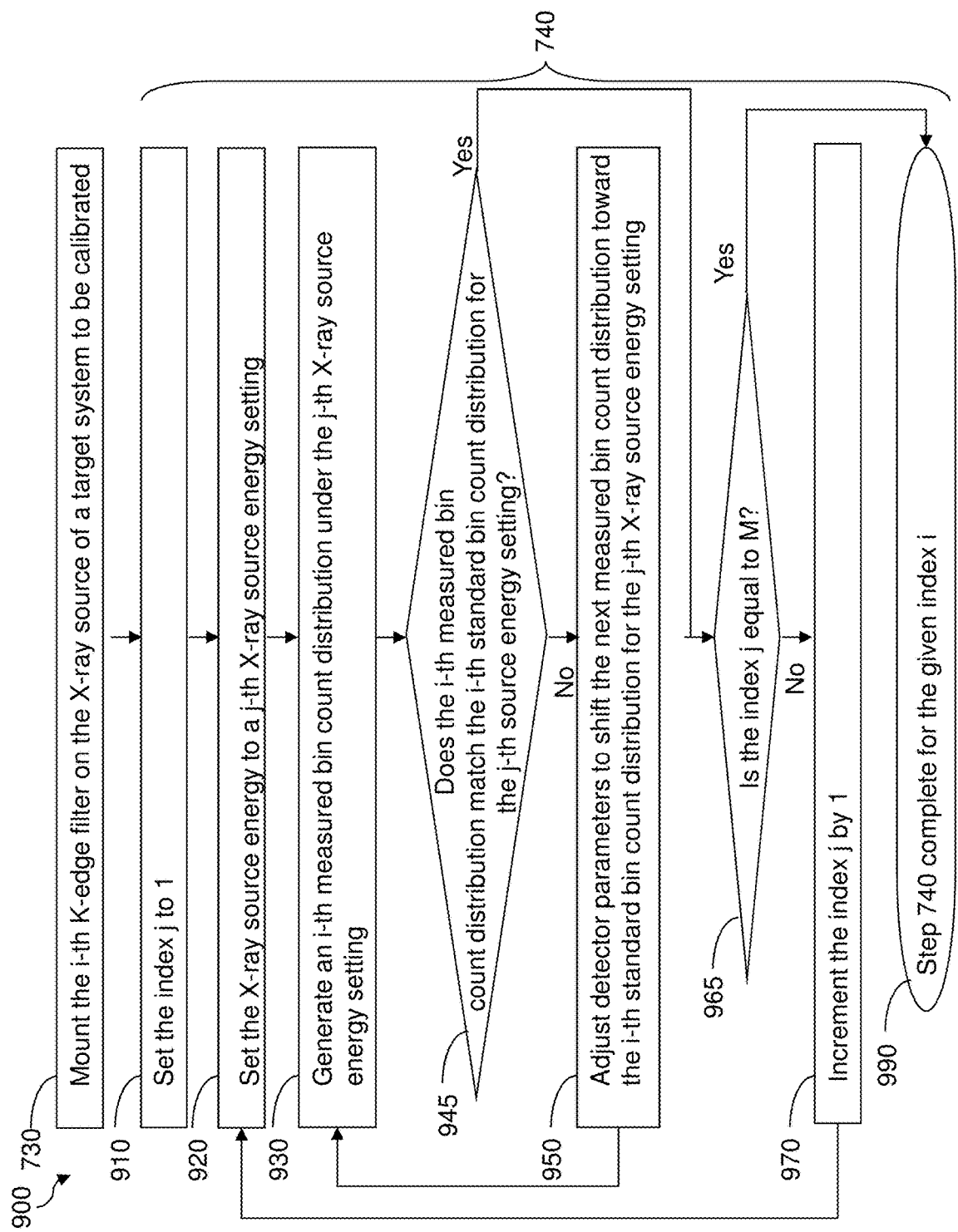
FIG. 9 is a flow diagram illustrating a method for matching at least one measured bin count distribution for a given K-edge filter with corresponding standard bin count distribution(s) according to an embodiment of the present disclosure.

Referring to FIG. 9, step 740 of the method 700 may include a set of sub-steps as illustrated in method 900.

Referring to step 910 of the method 900, a counting index j for the X-ray source index setting may be set to 1.

Referring to step 920 of the method 900, the X-ray source energy of the target system may be set to the j-th setting among the M settings for the X-ray source energy, which is the first setting when the counting index j is set to 1.

Referring to step 930, a bin count distribution may be measured under the setting of the j-th X-ray source energy setting and an i-th K-edge filter on the X-ray source. The measured bin count distribution constitutes the i-th measured bin count distribution for the j-th X-ray source energy setting.

Referring to step 945, the i-th measured bin count distribution under the j-th source energy setting is compared with the i-th standard bin count distribution under the j-th source energy setting.

If the i-th measured bin count distribution under the j-th source energy setting matches the i-th standard bin count distribution under the j-th source energy setting (i.e., step 945="Yes"), no adjustment to the calibration parameters of the target detectors is necessary, and the value of the index j may compared with M (i.e., the total number of settings for the X-ray source energy) in step 965. If the value of the index j is the same as M at step 965, the process for step 740 of the method 700 is complete for the given index i in step 990. If the value of the index j is less than M at step 965, the index j is incremented by 1 in step 970, and the X-ray source energy is set to the new j-th X-ray source energy setting in step 920 the steps 930-945 are repeated.

If the i-th measured bin count distribution under the j-th source energy setting does not match the i-th standard bin count distribution under the j-th source energy setting (i.e., step 945="No"), an adjustment may be made to detector parameters to shift the next measured bin count distribution toward the i-th standard bin count distribution for the j-th X-ray source energy setting in step 950. Adjustments may be made to the calibration parameters of the target detectors until the i-th measured bin count distribution under the j-th source energy setting matches, or closely approximates, the i-th standard bin count distribution under the j-th source energy setting upon re-measurement after the adjustments. Once the adjustments to the calibration parameters are completed, another bin count distribution may be measured under the setting of the j-th X-ray source energy setting and an i-th K-edge filter on the X-ray source in step 930, and the i-th measured bin count distribution under the j-th source energy setting is again compared with the i-th standard bin count distribution under the j-th source energy setting in step 945. Repeating steps 930 and 945 verifies that the i-th measured bin count distribution under the j-th source energy setting matches (within predefined tolerance window) the i-th standard bin count distribution under the j-th source energy setting under the new settings for the calibration parameters. The operations of generating measured bin count distributions, comparing the measured distributions to the standard bin count distribution and adjusting calibration parameters of the target detectors may be performed a number of times.

Figure 10:
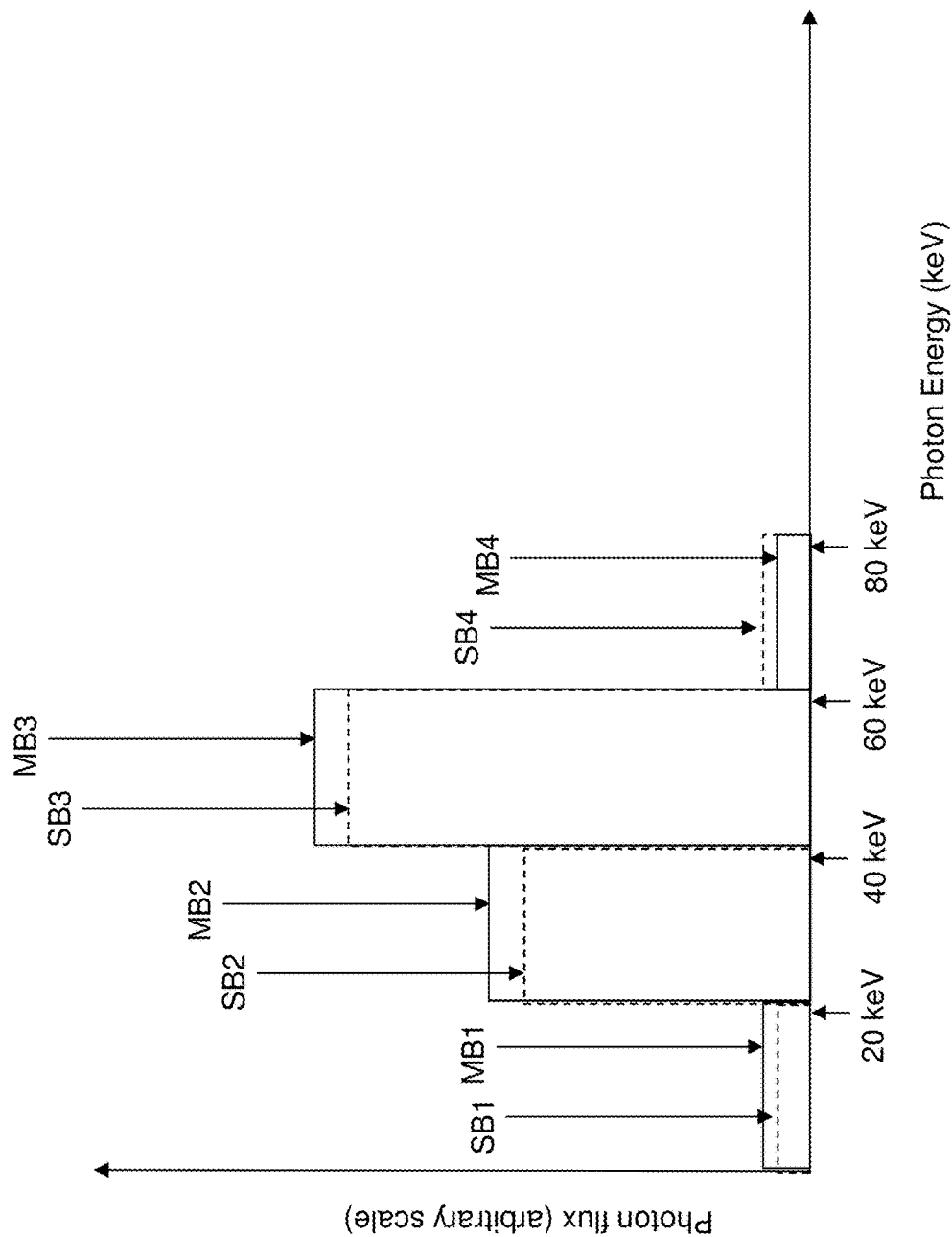
FIG. 10 schematically illustrates a comparison between a standard bin count distribution and a measured bin count distribution.

Referring to FIG. 10, an illustrative comparison between a standard bin count distribution (SB1, SB2, SB3, SB4) and a measured bin count distribution (MB1, MB2, MB3, MB4) is shown. In the illustrated example, each bin count distribution includes a distribution over four energy bins. The first energy bin has an energy range from 0 keV to 20 keV, the second energy bin has an energy range from 20 keV to 40 keV, the third energy bin has an energy range from 40 keV to 60 keV, and the fourth energy bin has an energy range from 60 keV to 80 keV. The measured bin count distribution (MB1, MB2, MB3, MB4) provides a higher total photon flux than the standard bin count distribution (SB1, SB2, SB3, SB4). Thus in the illustrated example the overall gain of the amplifier circuitry of the detectors in the target system needs to be adjusted among the calibration parameters. In addition, the boundary between the third energy bin and the fourth energy bin for the detectors in the target system (which is one of the calibration parameters) needs to be shifted upward so that the relative count for the fourth bin with respect to the third bin will be reduced. The example shown FIG. 10 is only illustrative, and other types of discrepancies may occur between each compared pair of an i-th measured bin count distribution under the j-th source energy setting and an i-th standard bin count distribution under the j-th source energy setting.

In some embodiments, the calibration parameters may include bin threshold adjusters that determine an energy range of a detection bin based on measured electrical current in a respective detector. In some embodiments, the bin threshold adjusters are configured to shift each detection current threshold between neighboring pairs of detection bins among an entire set of detection bins for the detectors of the target radiation detector system.

In some embodiments, the calibration parameters of the detectors of the target radiation detector system comprises signal gain controllers that determine a signal gain for a respective detection bin of the target radiation detector system. In some embodiments, the signal gain controllers are configured to change the signal gain for each detector bin for the detectors of the target radiation detector system.

In some embodiments, each detector of the target radiation detector system includes P detection bins in which P is an integer greater than 2, and one of the N different K-edge filters absorbs more than 90% of X-ray photons within at least one detection bin among the P detection bins that includes a detection bin with a highest energy range. In some embodiments, P may be in a range from 2 to 64.

In some embodiments, classification of a radiation detection signal into a bin may be based on measurement of electrical current generated by the detected signal. In such embodiments, calibrating the energy bins of the detectors of the target radiation detector system may include adjusting bin threshold currents of the detectors to reduce a mismatch between relative count ratios among the measured bin count distributions and relative count ratios among a respective corresponding standard bin count distribution.

In some embodiments, calibrating the energy bins of the detectors of the target radiation detector system may further include adjusting gains of energy bins of the detectors to reduce a mismatch between a total count of the measured bin count distributions and a total count of a respective corresponding standard bin count distribution.

Referring back to FIG. 7, in step 755 of the method 700 the value of the index i is compared with the number N after step 740 is completed. If the index i is less than N, the index i is incremented by 1 in step 760 and the next (i.e., new i-th) K-edge filter is mounted on the X-ray source of the target system in step 730 and step 740 of matching the an i-th measured bin count distribution with an i-th standard bin count distribution for each of M X-ray source energy settings while the i-th K-edge filter is on the X-ray source of the target system is performed again.

If the index i is equal to N at step 755, the calibration of the test system is completed in step 790.

Generally, the processing steps of FIGS. 7-9 may be employed to match at least one (such as M) measured bin count distribution for each given K-edge filter (among the N K-edge filters) with corresponding standard bin count distribution(s). In some embodiments, the at least one X-ray source energy setting may include M X-ray source energy settings, in which M is an integer greater than 1, and calibration of the energy bins of the detectors of the target radiation detector system may be performed for each source energy setting among the M X-ray source energy settings.

In some embodiments, M measured bin count distributions may be generated for each of the N different K-edge filters by sequentially providing each of the M X-ray source energy settings while a respective one of the N different K-edge filters remains in a path of the X-ray beam. The energy bins of the detectors may be calibrated to match the M measured bin count distributions with corresponding M standard bin count distributions generated with a corresponding K-edge filter.

In some embodiments, each of the N different K-edge filters may include an atomic element that provides a respective K-edge energy in which each K-edge energy is an energy selected from an energy range from 15 keV to 90 keV. In a non-limiting illustrative example, the N different K-edge filters includes a first K-edge filter containing a material block including cesium oxide and a second K-edge filter containing a material block consisting essentially of lead.

In some embodiments, the methods of the present disclosure enable testing and calibration of a detector array for a CT imaging system using two or more K-edge filters. Radioactive isotopes are needed only during generation of the sets of standard bin count distributions, which may be performed at a laboratory setting or during an initial installation of the on-site CT imaging system. The radioactive isotopes are not needed during subsequent testing or calibration. Thus, there is no need to transport or use radioactive isotopes for subsequent calibrations of the CT imaging system. Further, since the set of standard bin count distribution may be generated from a prototype system at a laboratory setting, there is no need to employ radioactive isotopes at any installation site of the CT imaging system.

X-ray spectra may be employed only for a single X-ray tube voltage setting, or for a plurality of X-ray tube voltage settings. Two or more K-edge filters may be used to compare the X-ray spectra. In an illustrative example, one of the K-edge filters may have a K-edge (such as a K-edge within an energy range from 30 keV to 50 keV) that is close in energy to a low end of an X-ray spectrum. Another of the K-edge filters may have a K-edge (such as a K-edge within an energy range from 80 keV to 120 keV) that is close in energy to a high end of the X-ray spectrum.

In a non-limiting illustrative example, a "peak technique" may be employed to calibrate the K-edge filters. First X-ray spectra for a given source energy setting may be measured without using any filter. Second X-ray spectra for the same source energy setting may be measured with a first K-edge filter, and a first energy transition point (at which the intensity of the second X-ray spectra has one half of the peak intensity of the second X-ray spectra) may be determined. Third X-ray spectra for the same source energy setting may be measured with a second K-edge filter, and a second energy transition point (at which the intensity of the third X-ray spectra has one half of the peak intensity of the third X-ray spectra) may be determined. A linear interpolation may be performed between the first energy transition point and the second energy transition point to generate an energy calibration line. The transition points may be collected for each detector, and analog to digital conversion calibration may be established.

In order to perform energy calibration, two energy points are required. In the standard calibration using radioactive isotope sources, $^{241}$Am emitting 60 keV photons and $^{57}$Co emitting 122 keV photons can be employed, although use of other isotopes is also possible. In various embodiments, a pair of K-edge filters may be selected such that the K-edge energy positions are sufficiently separated to reduce measurements error, and the K-edge energy positions are within an X-ray spectrum range (which is typically from 30 keV to 120 keV).

Figure 11:
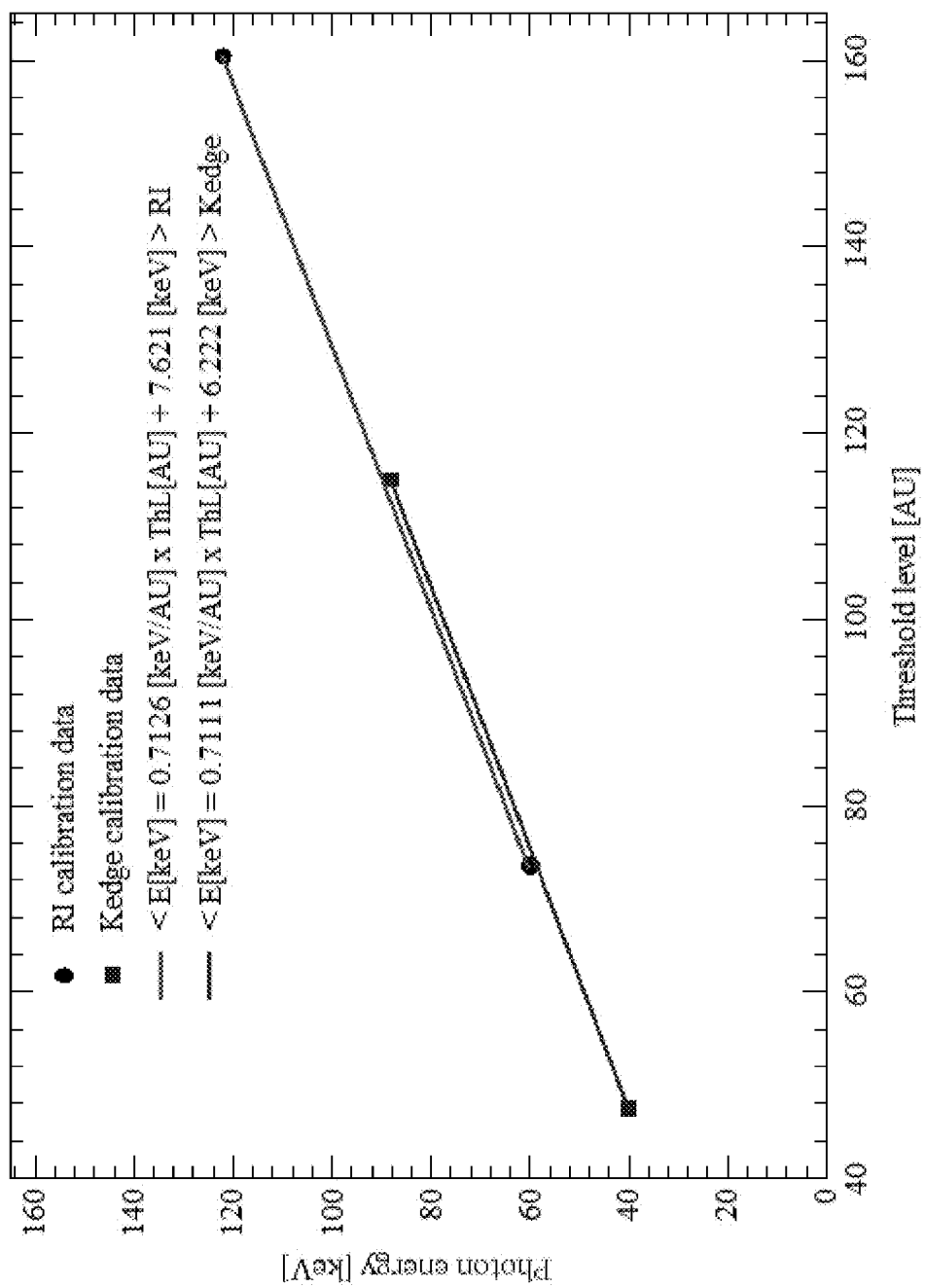
FIG. 11 illustrates a comparison of K-edge calibration with a radioactive isotope calibration.

Referring to FIG. 11, a comparison of K-edge calibration with a radioactive isotope calibration is illustrated. In the illustrated example, the energy calibration curves (keV vs. AU) obtained independently using standard radioactive isotope calibration and the K-edge calibration methods of the present disclosure are illustrated. For the K-edge calibration method of the present disclosure, a first K-edge filter including lead (having a first K-edge at 88 keV) and a second K-edge filter including cerium oxide (having a second K-edge at 40 keV) were employed as a pair of K-edge filters. The agreement between the two techniques is excellent, thereby validating the calibration method of the present disclosure.

Various systems and methods described herein provide a way to test a detector array with small pixel sizes that utilizes K-edge filters. The proposed methods do not require at the time of calibration use of radioactive point sources or X-ray fluorescence, both of which have significant difficulties today and require long testing times. Various methods described herein may include a method of testing a CT imaging system or its radiation detection sub-components, either at the manufacturing plant after sensor fabrication, or in operational use at the hospital or any other imaging facility. Use of multiple K-edge filters enables much faster energy calibration while providing effectively the same accuracy as conventional radioactive isotope calibration methods employing Am$^{241}$ and Co$^{57}$.

The radiation detectors of the present embodiments may be used for medical imaging, such as in Low-Flux applications in Nuclear Medicine (NM), whether by Single Photon Emission Computed Tomography (SPECT) or by Positron Emission Tomography (PET), or as radiation detectors in High-Flux applications as in X-ray Computed Tomography (CT) for medical applications, and for non-medical imaging applications, such as in baggage security scanning and industrial inspection applications.

According to further embodiments of the present disclosure, energy resolution (ER) of a detector system can be measured and calibrated from K-edge spectral data without use of radioactive isotopes, such as Am$^{241}$. As used herein, the energy resolution (ER) of a detector measures the inherent energy spread that occurs during detection due to the imperfect energy value detection of the detector. Conventionally, energy resolution refers to the full-width of the range of counts vs. photon energy at half of the maximum photon energy level (the "full-width half-maximum" energy range or "FWHM") in a measured energy spectrum when the incident particles have a well-defined single energy. In applications in which the measured X-ray energy spectrum from a monochromatic energy source exhibits a Gaussian shape, the energy resolution is about 2.355 times the standard distribution (sigma) of the Gaussian function. Typical fully-functional X-ray detectors have an energy range within a range from 6 keV to 10 keV. By enabling measurement of energy resolution of a detector without employing an isotope source, a K-edge energy calibration can be performed in conjunction with energy resolution measurements, thereby providing complete calibration and qualification of a detector system without relying on any isotope source.

The technique of extracting energy resolution from the K-edge X-ray spectral data to be described below offers effectively the same accuracy as the conventional energy resolution measurement employing radioactive isotopes. Therefore, use of radioactive isotopes $Am^{241}/Co^{57}$ can be completely eliminated for the K-edge calibration and energy range extraction for an X-ray detector system. Eliminating the use of radioactive isotopes in calibrations offers advantages in production and in field operations of an X-ray detector system by reducing test and calibration time by an order of magnitude, for example, from hours to minutes. Sensor re-qualification and energy calibration can be performed in the field with minimal disruption in the operation of the X-ray system.

Figure 12:
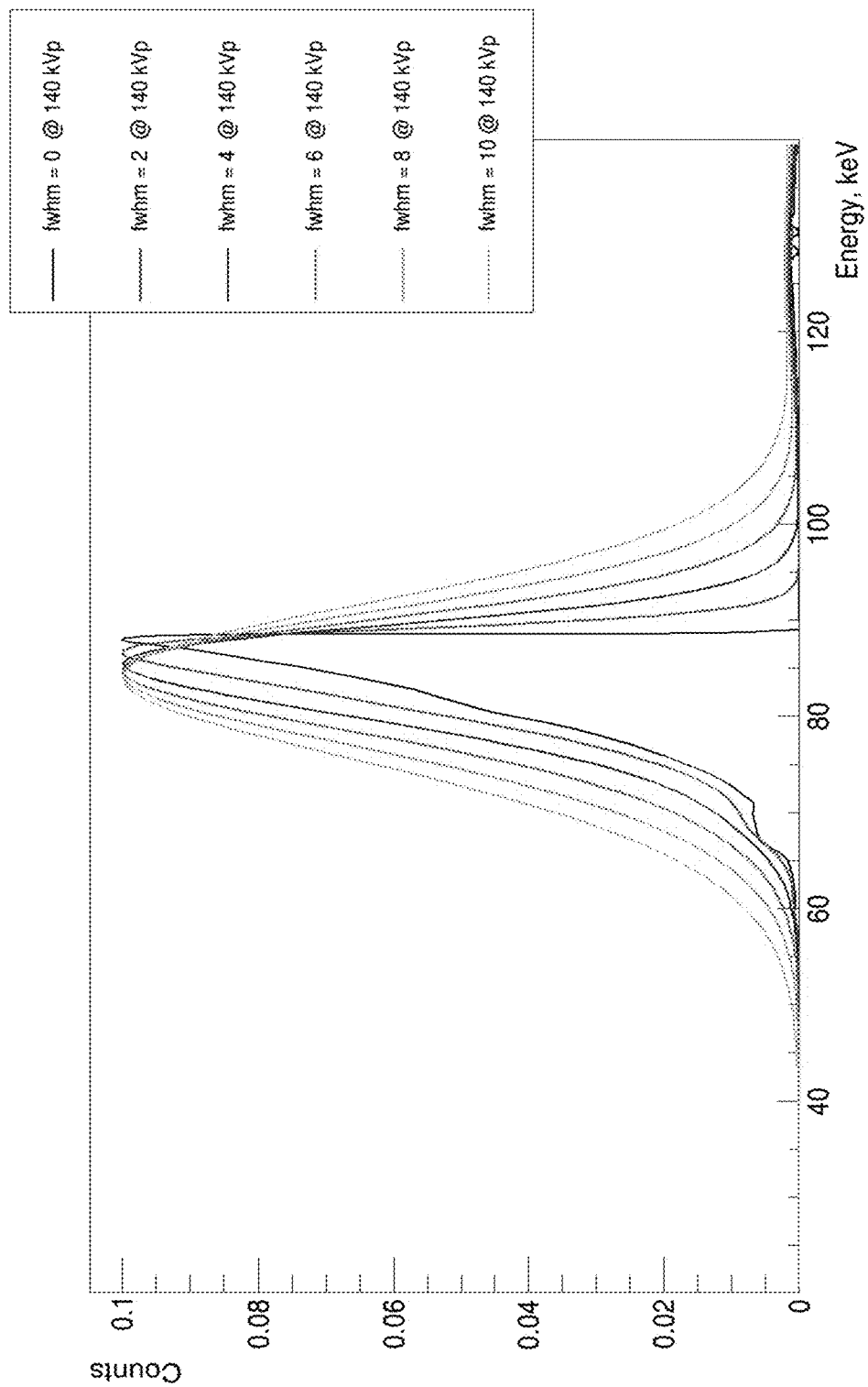
FIG. 12 illustrates simulations on X-ray spectra that passes through a Pb K-edge filter.

Referring to FIG. 12, X-ray spectrum simulations show that the slope of the K-edge transition (for Pb at 88 keV in this case) is dependent on the energy range value. X-ray tube voltage is 140 kV in the simulations illustrated in FIG. 12. The K-edge calibration according to embodiments of the present disclosure uses two characteristic points in X-ray spectra. Generally speaking, any set of two points that characterizes the K-edge can be used for energy resolution extraction. In practice, a high energy K-edge (such as the 88 keV K-edge of Pb) may be used. The slope of the K-edge transmission from high to low energies is dependent on the ratio of the energy range, i.e., the full width at half maximum of the measured energy spectrum. For example, if the energy range is zero (which is the case with an ideal detector), the slope of the K-edge transition is infinite. As the energy range of the detector increases, the magnitude of the slope of transition decreases. By measuring the slope of this transition, the value of the energy range can be extracted. While a Gaussian kernel fit is illustrated in FIG. 12, the extraction can be performed employing other fitting functions.

Figure 13:
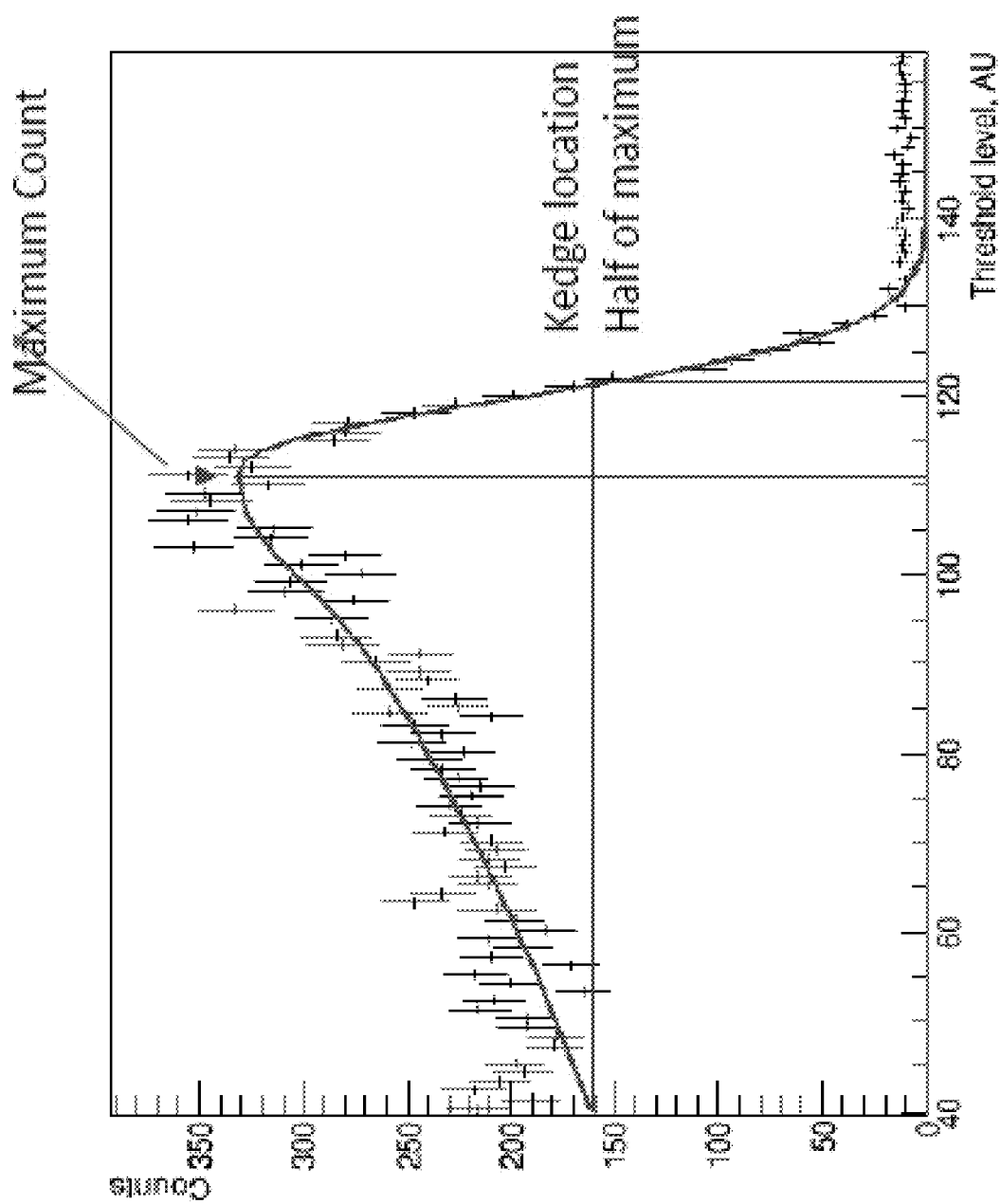
FIG. 13 illustrates a measured X-ray spectrum that was obtained using a Pb K-edge filter.

FIG. 13 illustrates a measured X-ray spectrum obtained using a Pb K-edge filter that provides a K-edge at 88 keV. Discrete vertical bars represent measured data points, and the continuous line represents a fitting function. The fitting function is selected to ignore noise signal at and around 140 keV. An algorithm for the energy resolution extraction can employ the parameters of a response function after fitting to determine the energy resolution. The observed energy resolution can be calculated from the difference of K edge location and the location of the X-ray Peak under the spectral line.

The fit function y can be described as:

$$y = \begin{cases} N \cdot G, & E > E_{peak} \\ N \cdot \left( G + \exp\left(\frac{E - E_{peak}}{\lambda}\right) \cdot (1 - G) \right), & E \leq E_{peak} \end{cases},$$

in which $$G = \exp\left( -\frac{4 \cdot \ln 2 \cdot (E - E_{peak})^2}{FWHM^2} \right).$$

The parameter N is used for the normalization to the peak height and two different width parameters are introduced. The width FWHM of the Gaussian describes the high-energy side of the peak and calculated $E_{N/2}$–$E_{peak}$, $\lambda$ describes the low energy tail. $E_{peak}$ is the most probable peak energy. The fit function y is exemplary, and other fit functions can also be employed.

Figure 14:
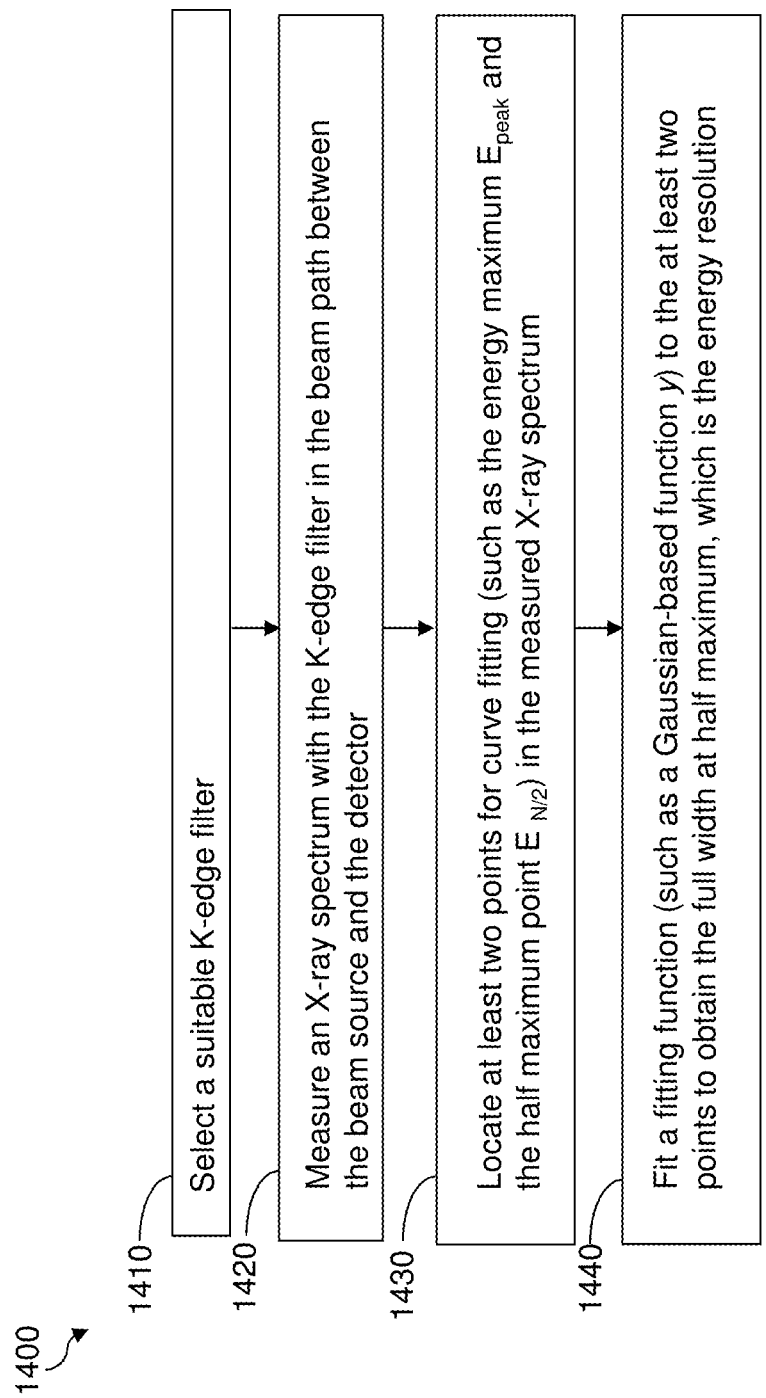
FIG. 14 illustrates a method 1400 for extraction of the energy resolution from an X-ray spectrum using a K-edge filter according to some embodiments.

FIG. 14 illustrates a method 1400 for extraction of the energy resolution from an X-ray spectrum using a K-edge filter according to some embodiments. Such embodiments may include the operations of selecting a suitable K-edge filter in step 1410, measuring an X-ray spectrum with the K-edge filter in the beam path between the beam source and the detector in step 1420, locating at least two points for curve fitting (such as the energy maximum $E_{peak}$ and the half maximum point $E_{N/2}$) in the measured X-ray spectrum in step 1430, and fitting a fitting function (such as a Gaussian-based function y described above) to the at least two points to obtain the full width at half maximum, which is the energy resolution in step 1440.

Figure 15:
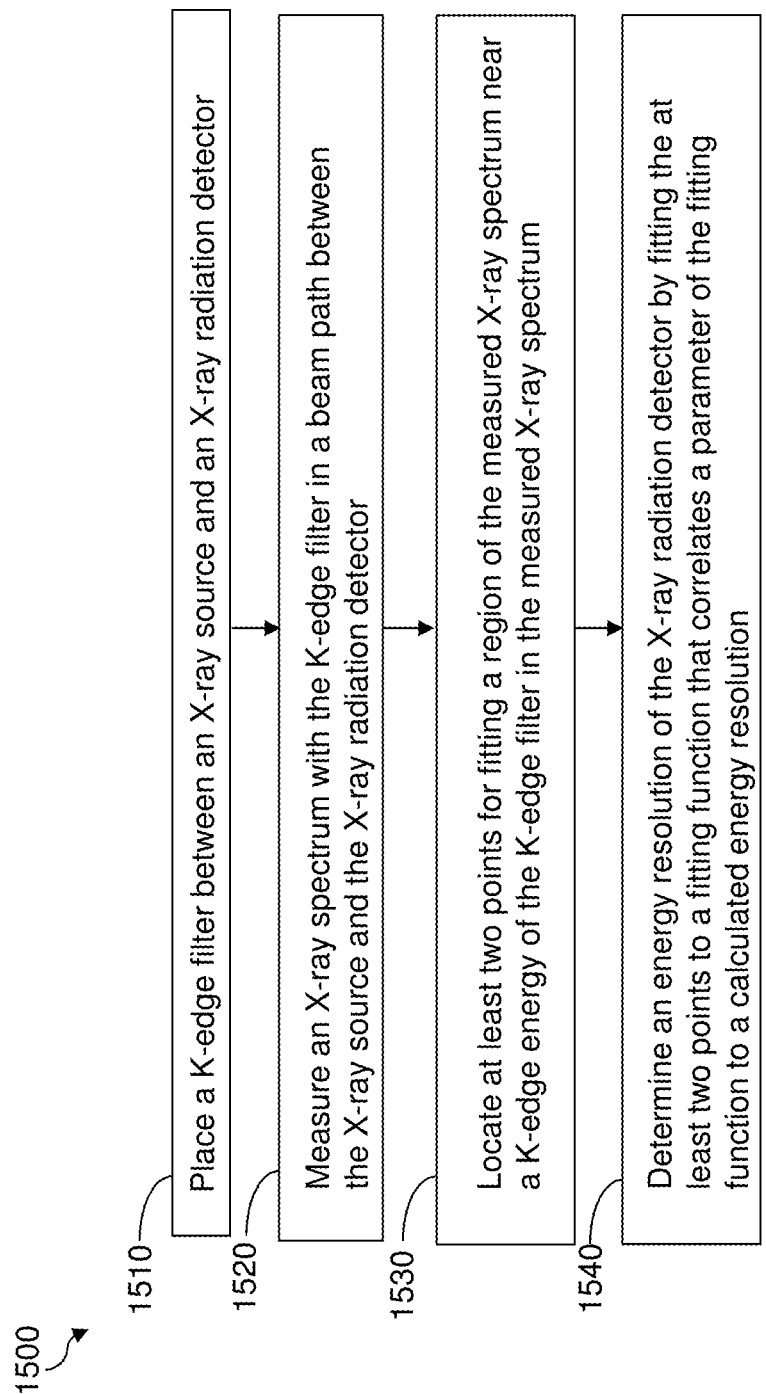
FIG. 15 illustrates a method 1500 measuring an energy resolution of an X-ray radiation detector using a K-edge filter according to an embodiment.

FIG. 15 illustrates a method 1500 measuring an energy resolution of an X-ray radiation detector using a K-edge filter according to an embodiment of the present disclosure. The method 1500 of measuring an energy resolution of an X-ray radiation detector may include placing a K-edge filter between an X-ray source and an X-ray radiation detector in step 1510, measuring an X-ray spectrum with the K-edge filter in a beam path between the X-ray source and the X-ray radiation detector in step 1520, locating at least two points for fitting a region of the measured X-ray spectrum near a K-edge energy of the K-edge filter in the measured X-ray spectrum in step 1530, and determining an energy resolution of the X-ray radiation detector by fitting the at least two points to a fitting function that correlates a parameter of the fitting function to a calculated energy resolution in step 1540.

In some embodiments, the fitting function generates the measured energy resolution in step 1540 by fitting a region of the measured X-ray spectrum near the K-edge energy of the K-edge filter. In some embodiments, the at least two points located in step 1530 comprise points having a respective measured intensity in a range from 5% to 95% of a local maximum intensity of the measured X-ray spectrum in proximity to the K-edge energy of the K-edge filter.

In some embodiments, the parameter of the fitting function used in step 1540 comprises a slope of a line or a curve that fits the at least two points. For example, the slope of a line that fits a region of the measured X-ray spectrum around the K-edge can be employed to correlate the measured spectrum with a measured energy resolution of the X-ray detector. Alternatively, a slope, at a predefined location relative to the K-edge, of a curve that fits a region of the measured X-ray spectrum around the K-edge can be employed to correlate the measured spectrum with a measured energy resolution of the X-ray detector. In some embodiments, the energy resolution is a strictly decreasing function of a magnitude of the slope of the line or the curve.

As used herein, the process of fitting at least two points to a fitting function in step 1540 includes not only mathematical fitting of measured data to a predefined fitting function to minimize deviation of the fitting function from the measured X-ray spectrum (for example, as measured by root mean square methods), but also use of a look-up table.

The method of some embodiments may be implemented by providing a special-purpose computer equipped with a specialized automated program implementing the method 1500 that outputs a calculated energy resolution upon providing an input in the form of the measured X-ray spectrum. The special-purpose computer may include at least one processor unit in communication with at least one memory unit, and can have input interfaces configured to receive data on the measured X-ray spectrum through wired or wireless communication and by upon connection of a portable memory device (such as a flash memory device), and can have output interfaces that outputs the calculated energy resolution by visual display, by a printout, by wired or wireless communication, and or by saving data in a portable or non-portable data storage medium.

In some embodiments, the at least two points comprise at least three points, and the region of the measured X-ray spectrum near the K-edge energy of the K-edge filter comprises a portion of the measured X-ray spectrum that extends from a photon energy corresponding to a local maximum intensity of the measured X-ray spectrum to a photon energy corresponding to an intensity of one half of the local maximum intensity of the measured X-ray spectrum.

In some embodiments, the region of the measured X-ray spectrum near the K-edge energy of the K-edge filter comprises an additional portion of the measured X-ray spectrum that extends from the photon energy corresponding to the intensity of one half of the local maximum intensity of the measured X-ray spectrum to a photon energy that is twice the photon energy corresponding to the intensity of one half of the local maximum intensity of the measured X-ray spectrum less the photon energy corresponding to the local maximum intensity of the measured X-ray spectrum.

In some embodiments, the fitting function can have two components including a high energy tail component, such as a portion of a Gaussian function, that fits a high energy portion, and a low energy background component that fits a background portion of the measured X-ray spectrum. In such embodiments, the high energy tail component may fit all, or a portion of, the energy range of the measured X-ray spectrum having an energy that is higher than the energy at which one half of the maximum intensity in the measured X-ray spectrum occurs near the K-edge. In such embodiments, the low energy background component fits all, or a portion of, the energy range of the measured X-ray spectrum having an energy that is lower than the energy at which one half of the maximum intensity in the measured X-ray spectrum occurs near the K-edge.

In some embodiments, the fitting function comprises: a high energy tail component that fits the measured X-ray spectrum above the photon energy corresponding to the intensity of one half of the local maximum intensity of the measured X-ray spectrum; and a low energy background component that fits the measured X-ray spectrum below the photon energy corresponding to the intensity of one half of the local maximum intensity of the measured X-ray spectrum. In such embodiments, the high energy tail component may include a term that is linearly or non-linearly proportional to a Gaussian function.

Figure 16:
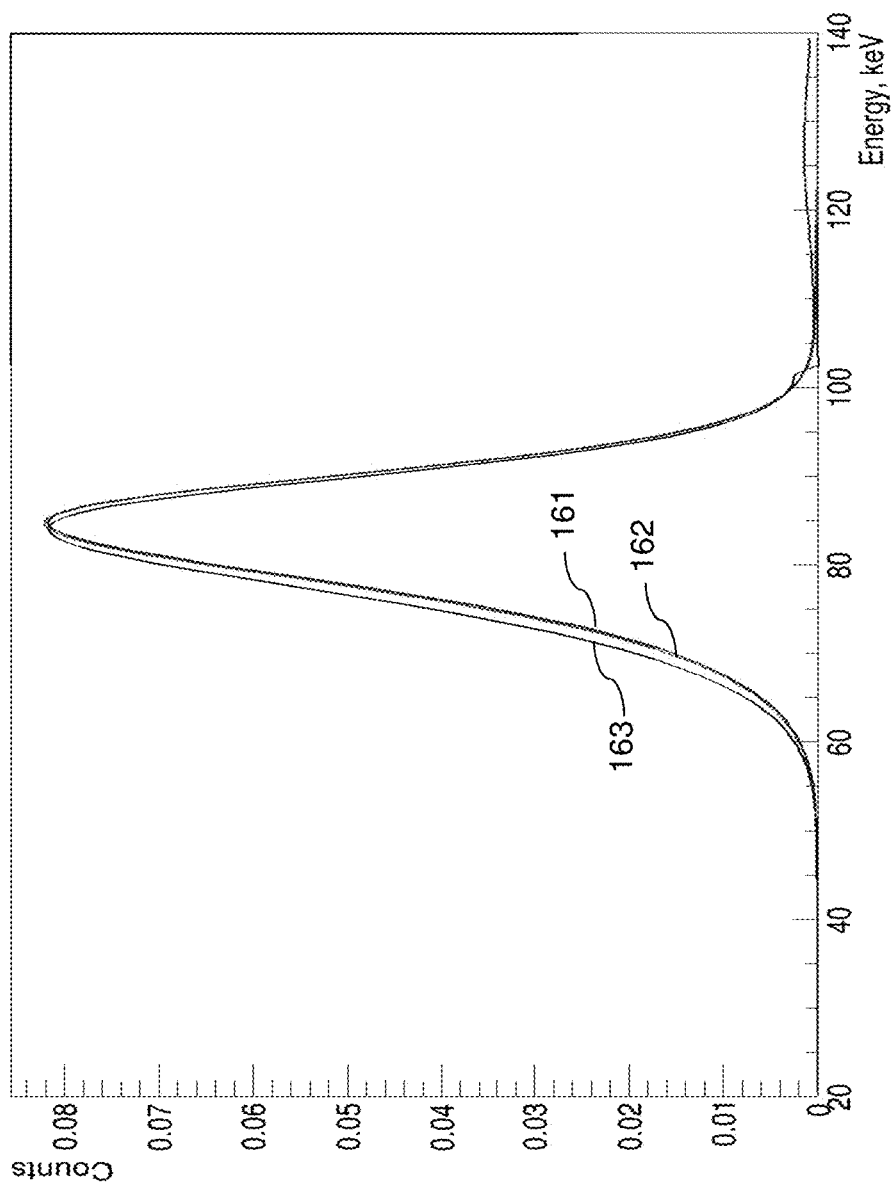
FIG. 16 illustrates X-ray simulations for the case of 6 keV energy resolution at different tube voltages.

Referring to FIG. 16, X-ray simulations are illustrated for the case of 6 keV energy resolution at different tube voltages. The X-ray simulations show that the slope of the K-edge transition (which is the lead Pb line at 88 keV in this case) is independent of X-ray tube voltage. Curve 161 corresponds to the case of 100 kV tube voltage, curve 162 corresponds to the case of 120 kV tube voltage, and curve 163 corresponds to the case of 140 kV tube voltage. The peaks for the 120 kV tube voltage and for the 140 kV tube voltage are virtually the same, while the peak for the 100 kV tube voltage are shifted by a minimal voltage. Curves 161, 162, and 162 show that the slope is rather independent of the X-ray tube voltage for a given energy resolution. To check the robustness of the energy resolution extraction the following simulations have been run. X-ray spectra were simulated with various energy resolution values. Then the simulated X-ray spectra were treated as experimental, and values for the energy resolution were extracted. Table 1 shows that the extraction error is very small (less than about 0.25 keV), which is fully acceptable in practice.

TABLE 1

Extraction errors when energy range is extracted employing the fitting function y for a spectrum having an energy range of 6.0

| Tube Voltage (kV) | Extracted energy range (keV) | True energy range (keV) | Error in energy range estimation (keV) |
|---|---|---|---|
| 100 | 6.25 | 6.00 | 0.25 |
| 120 | 6.21 | 6.00 | 0.21 |
| 140 | 6.19 | 6.00 | 0.19 |

Figure 17A:
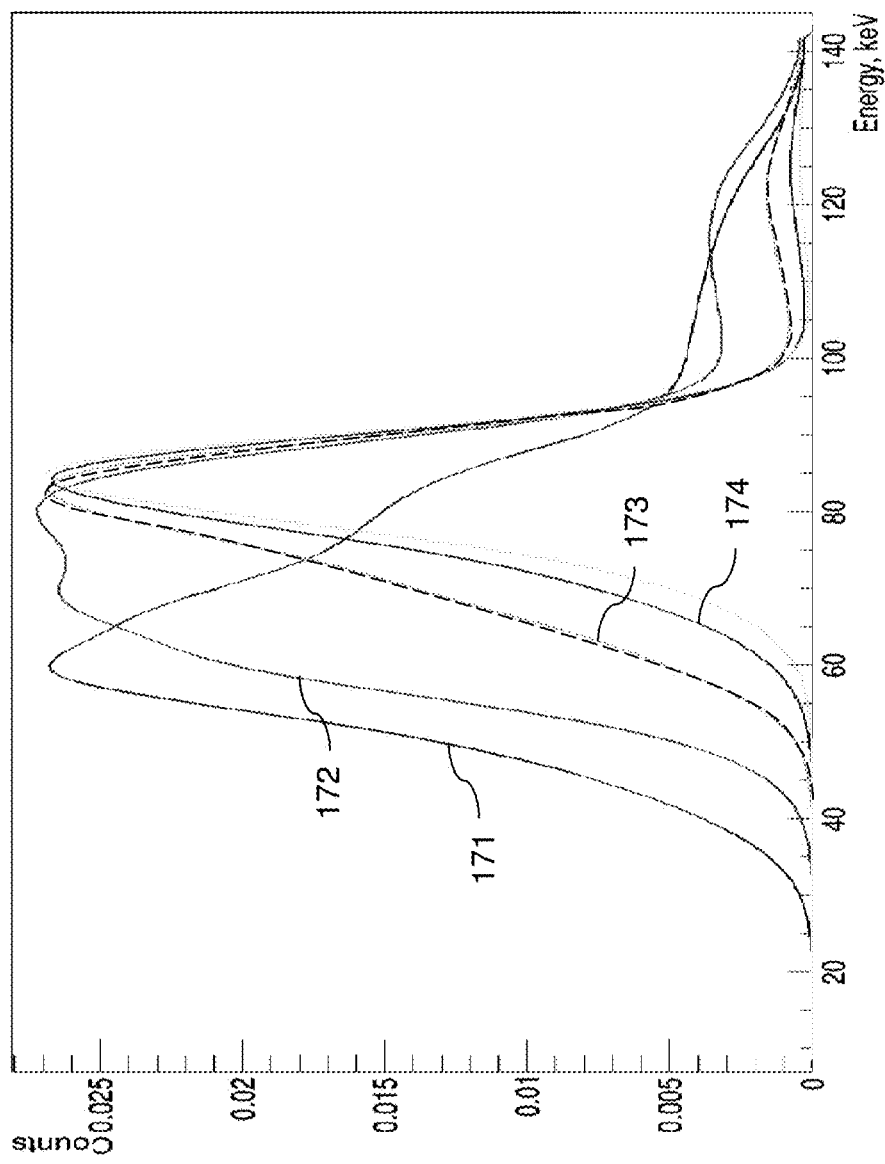
FIG. 17A illustrates simulated X-ray spectra for Pb K-edge filters having thicknesses of 0.2 mm, 0.5 mm, 1.0 mm, and 1.5 mm.
Figure 17B:
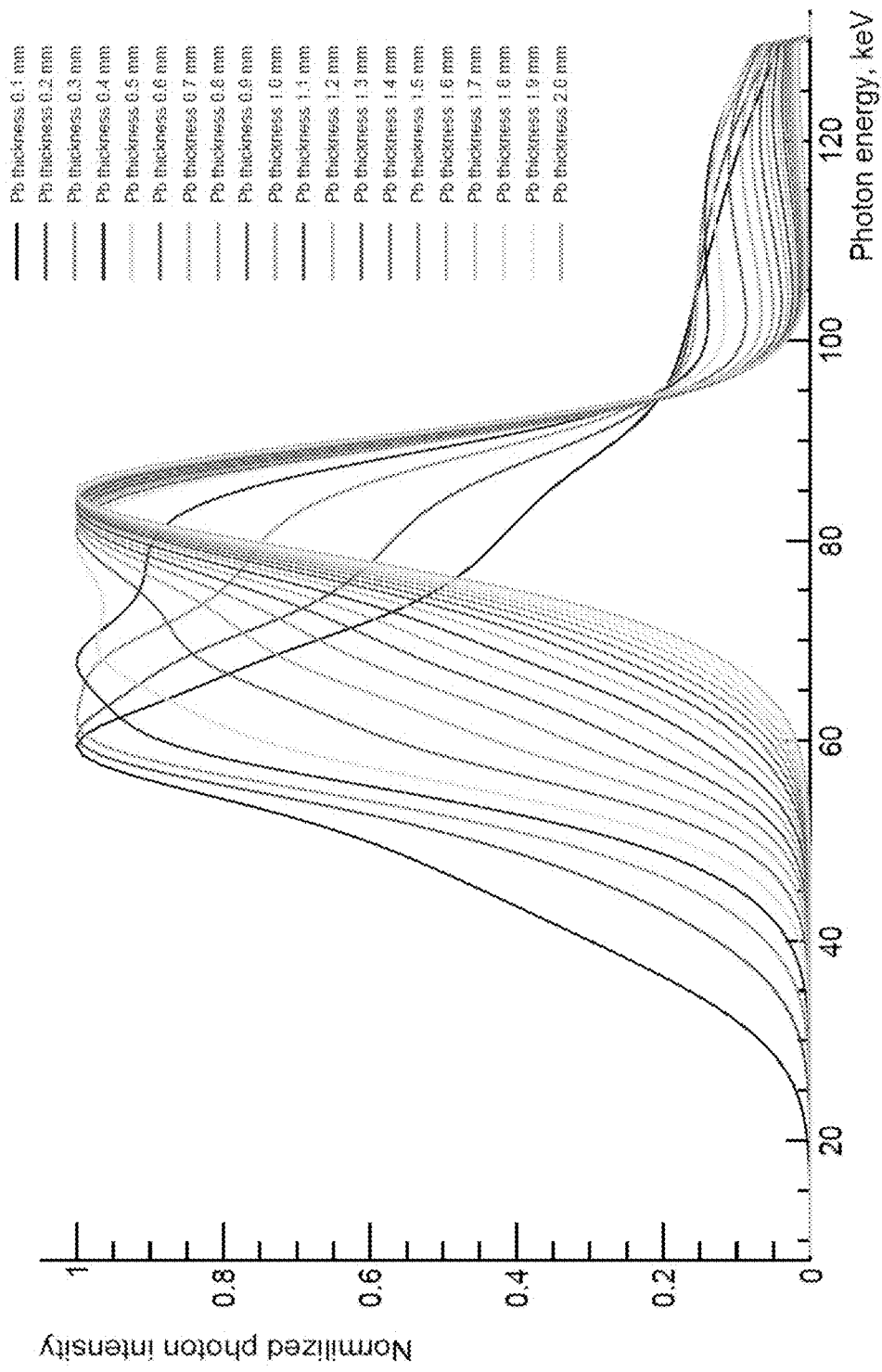
FIG. 17B illustrates simulated X-ray spectra for Pb K-edge filters having thicknesses in a range from 0.1 mm to 2.0 mm in increments of 0.1 mm.

The thickness of the K-edge filter can be selected to ensure proper extraction of the energy range. FIGS. 17A and 17B show simulation results with Pb K-edge filters with various thicknesses. The tube voltage is 140 kV for all cases, and the energy range employed for the simulation was 6.0 keV. Curve 171 in FIG. 17A is a simulated X-ray spectrum for a 0.2 mm thick Pb K-edge filter, curve 172 in FIG. 17A is a simulated X-ray spectrum for a 0.5 mm thick Pb K-edge filter, curve 173 in FIG. 17A is a simulated X-ray spectrum for a 1.0 mm thick Pb K-edge filter, and curve 174 in FIG. 17A is a simulated X-ray spectrum for a 1.5 mm thick Pb K-edge filter. FIG. 17B illustrates simulated X-ray spectra for Pb K-edge filters having thicknesses in a range from 0.1 mm to 2.0 mm in increments of 0.1 mm.

In the case of a Pb K-edge filter, a thickness of at least 1 mm thickness is needed to obtain a proper K-edge profile. Generally, thick K-edge filters tend to attenuate the X-ray signal significantly and may render energy range measurements error prone. Thus, for the case of a Pb K-edge filter, a thickness range from 1 mm to 2 mm may be the optimal thickness range. Other K-edge filter materials can have different optimal thickness ranges for the purpose of measuring the energy range of the detector system.

In some embodiments, the thickness of the K-edge filter may be selected such that the photon energy corresponding to the intensity of one half of the local maximum intensity of the measured X-ray spectrum is within a range from 99% to 101% of the K-edge energy.

Figure 18:
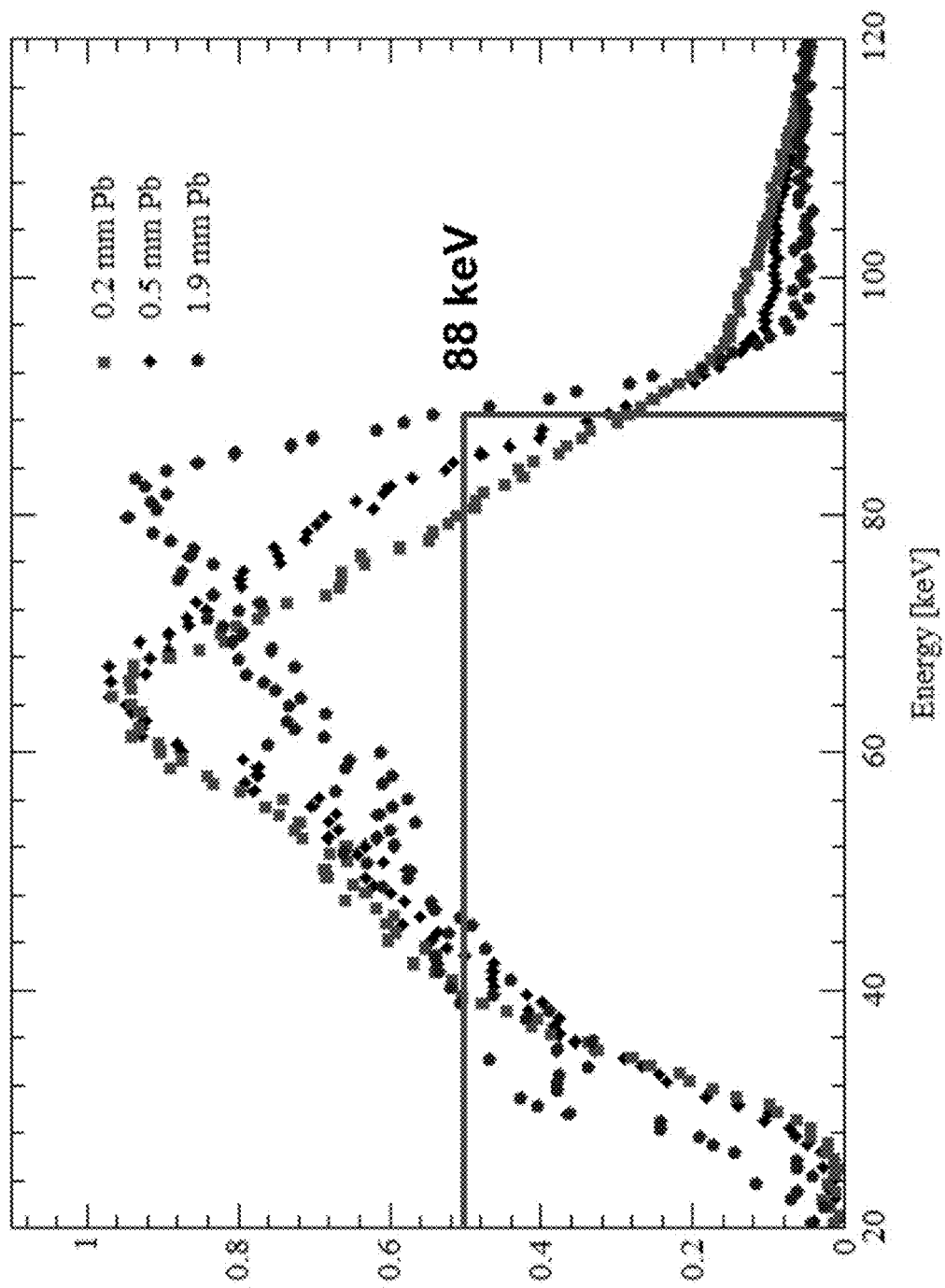
FIG. 18 illustrates experimentally measured X-ray spectra with 3 different K-edge filter thicknesses 0.5 mm, 1.0 mm, and 1.9 mm.

FIG. 18 illustrates experimentally measured X-ray spectra with 3 different K-edge filter thicknesses 0.5 mm, 1.0 mm, and 1.9 mm. The 1.9 mm thick filter produced a measured peak energy of 88 keV and a sharp transition with a well-defined slope that enabled calculation of the energy range of the detector system.

Additional spectra measurements were performed at various tube currents, which correspond to different photon flux rates. Such tests offer the opportunity for studying the relationship between the energy resolution and the photon flux, which is not possible with weak radioactive sources such as $Am^{241}$ or $Co^{57}$. Table 2 shows the dependency of measured energy resolution on the photon flux. The measured degradation of less than 0.3 keV is minimal even at high tube current of 15 mA, as one would expect in a properly designed high-flux CT system, such as a system offered by Redlin Technologies.

TABLE 2

Measured mean energy resolution and standard deviation for energy resolution at various X-ray currents

| Tube curent (mA) at 140 kV tube voltage | Photon flux at 30 cm distance (million counts per second per mm$^2$ | Average of measured energy resolution (keV) | Standard deviation of the measured energy resolution (keV) |
| --- | --- | --- | --- |
| 1.0 | 8.36 | 6.614 | 1.08 |
| 3.0 | 25 | 6.659 | 0.92 |
| 7.0 | 58.5 | 6.716 | 0.89 |
| 10.0 | 83.6 | 6.813 | 0.83 |
| 15.0 | 125 | 6.909 | 0.83 |

Figure 19:
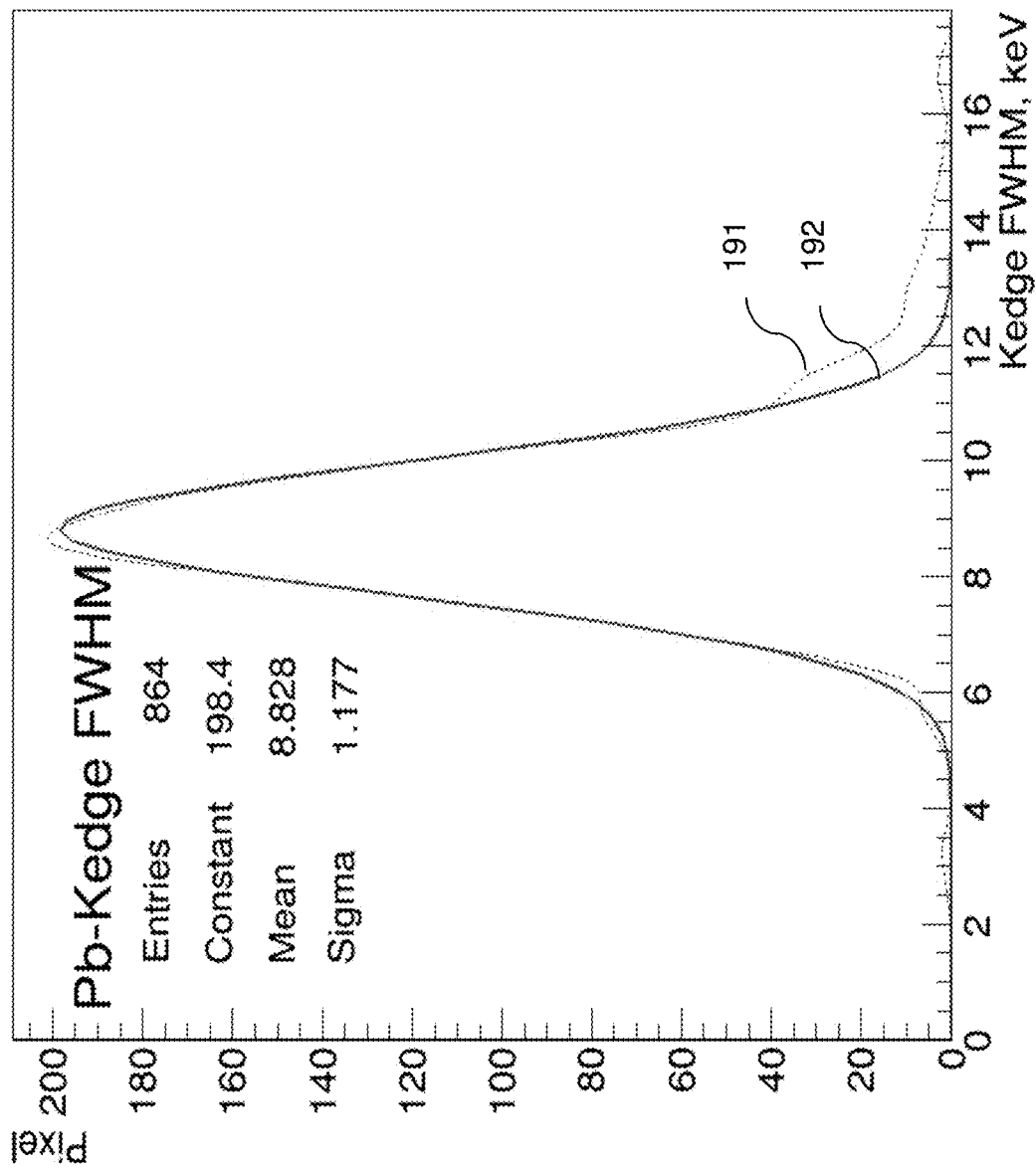
FIG. 19 illustrates a distribution of measured energy resolution values on an 864 pixel array.

Referring to FIG. 19, distribution of measured energy resolution values on an 864 pixel array is illustrated. Curve 191 represents the measured distribution, and curve 192 represents a Gaussian fit to the measured distribution. In this example, the mean of the measured energy resolution was 8.80 keV and the standard deviation of the measured energy resolution was 1.17 keV. The measurement data was in agreement with measurements performed with Am$^{241}$ radioactive sources.

Referring to FIGS. 20A-20D, settings for the electronics of the detector system were modified to check whether the change of energy resolution due to detector electronics is accurately reflected in the energy resolution measurement method of the present disclosure.

Figure 20A:
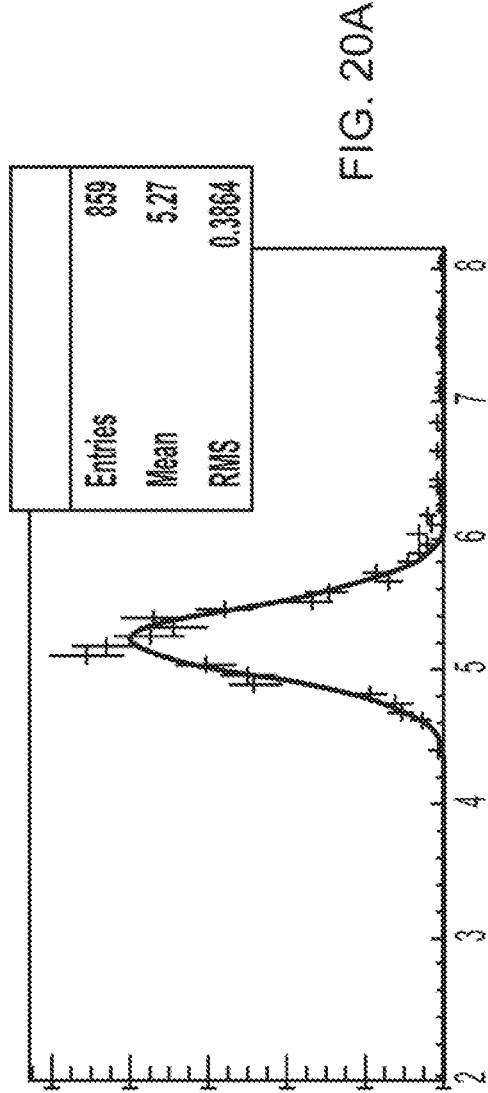
FIG. 20A shows the distribution of measured energy resolution employing a 1.9 mm thick Pb K-edge filter according to an embodiment of the present disclosure under a first capacitor value setting (of 9 fF) for an X-ray detector array.
Figure 20B:
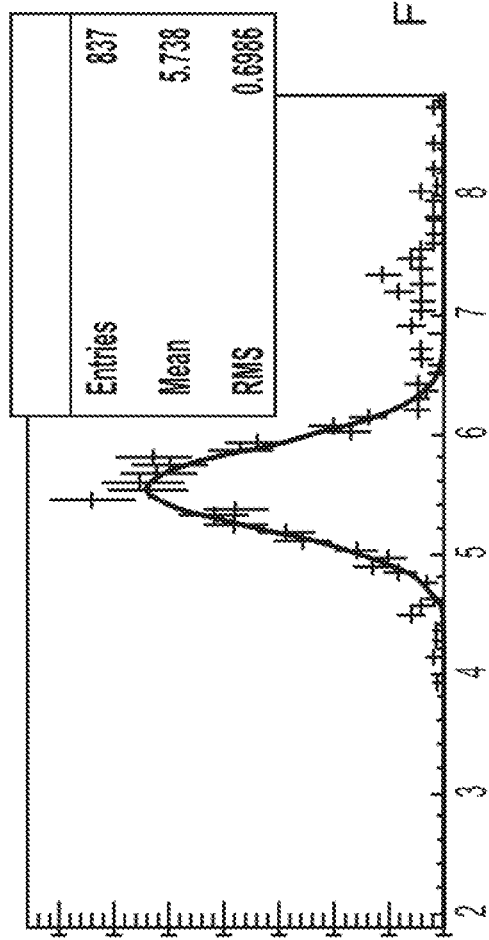
FIG. 20B shows the distribution of measured energy resolution employing $Am^{241}$ as a radioactive X-ray source under the first capacitor value setting.

FIG. 20A shows the distribution of measured energy resolution employing a 1.9 mm thick Pb K-edge filter according to an embodiment under a first capacitor value setting (of 9 fF) for an X-ray detector array. FIG. 20B shows the distribution of measured energy resolution employing Am$^{241}$ as a radioactive X-ray source under the first capacitor value setting. The measurements plotted in FIG. 20A provides a mean energy resolution of 5.27 keV with a standard deviation of 0.39 keV for the energy resolution. The measurements plotted in FIG. 20B provides a mean energy resolution of 5.74 keV with a standard deviation of 0.70 keV for the energy resolution. The difference of less than 0.5 keV is acceptable in practice.

FIG. 20C shows the distribution of measured energy resolution employing a 1.9 mm thick Pb K-edge filter according to an embodiment of the present disclosure under a second capacitor value setting (of 11 fF) for the X-ray detector array. FIG. 20D shows the distribution of measured energy resolution employing Am$^{241}$ as a radioactive X-ray source under the second capacitor value setting. The measurements plotted in FIG. 20C provides a mean energy resolution of 7.23 keV with a standard deviation of 1.00 keV for the energy resolution. The measurements plotted in FIG. 20D provides a mean energy resolution of 7.68 keV with a standard deviation of 1.13 keV for the energy resolution. The energy resolution measured employing a K-edge filter is in agreement with energy resolution measured employing Am$^{241}$ as a radioactive X-ray source.

In some embodiments, methods of calibrating a radiation detector system including a plurality of energy bins per each detector are provided. The methods include calibrating a radiation detector system including a plurality of energy bins per each detector employing the methods of the present disclosure, and performing the method of measuring an energy resolution of an X-ray radiation detector on each radiation detector within the radiation detector system employing the methods of the present disclosure. Electronics parameters for the radiation detector system are then adjusted to a provide an energy resolution within a specification range based on a measured energy resolution obtained by performing the methods of the present disclosure.

While the disclosure has been described in terms of specific embodiments, it is evident in view of the foregoing description that numerous alternatives, modifications and variations will be apparent to those skilled in the art. Each of the embodiments described herein may be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

What is claimed is:

1. A method of measuring an energy resolution of an X-ray radiation detector, comprising:
   placing a K-edge filter between an X-ray source and an X-ray radiation detector;
   measuring an X-ray spectrum with the K-edge filter in a beam path between the X-ray source and the X-ray radiation detector;
   locating at least two points for fitting a region of the measured X-ray spectrum near a K-edge energy of the K-edge filter in the measured X-ray spectrum; and
   determining an energy resolution of the X-ray radiation detector by fitting the at least two points to a fitting function that correlates a parameter of the fitting function to obtain a full width at half maximum (FWHM) value of the measured X-ray spectrum.

2. The method of claim 1, wherein the at least two points comprise points having a respective measured intensity in a range from 5% to 95% of a local maximum intensity of the measured X-ray spectrum in proximity to the K-edge energy of the K-edge filter.

3. The method of claim 2, wherein the parameter of the fitting function comprises a slope of a line or a curve that fits the at least two points.

4. The method of claim 3, wherein the energy resolution is a strictly decreasing function of a magnitude of the slope of the line or the curve.

5. The method of claim 1, wherein:
   the at least two points comprise at least three points; and
   the region of the measured X-ray spectrum near the K-edge energy of the K-edge filter comprises a portion of the measured X-ray spectrum that extends from a photon energy corresponding to a local maximum intensity of the measured X-ray spectrum to a photon energy corresponding to an intensity of one half of the local maximum intensity of the measured X-ray spectrum.

6. The method of claim 5, wherein the region of the measured X-ray spectrum near the K-edge energy of the K-edge filter comprises an additional portion of the measured X-ray spectrum that extends from the photon energy corresponding to the intensity of one half of the local maximum intensity of the measured X-ray spectrum to a photon energy that is twice the photon energy corresponding to the intensity of one half of the local maximum intensity of the measured X-ray spectrum less the photon energy corresponding to the local maximum intensity of the measured X-ray spectrum.

7. The method of claim 6, wherein the fitting function comprises:
   a high energy tail component that fits the measured X-ray spectrum above the photon energy corresponding to the intensity of one half of the local maximum intensity of the measured X-ray spectrum; and a low energy background component that fits the measured X-ray spectrum below the photon energy corresponding to the intensity of one half of the local maximum intensity of the measured X-ray spectrum.

8. The method of claim 7, wherein the high energy tail component comprises a term that is linearly or non-linearly proportional to a Gaussian function.

9. The method of claim 1, wherein the fit function y is described as:

$$y = \begin{cases} N \cdot G, & E > E_{peak} \\ N \cdot \left(G + \exp\left(\dfrac{E - E_{peak}}{\lambda}\right) \cdot (1 - G)\right), & E \leq E_{peak} \end{cases},$$

in which $$G = \exp\left(-\dfrac{4 \cdot \ln 2 \cdot (E - E_{peak})^2}{FWHM^2}\right),$$

wherein:
- E is the energy of photons within the measured X-ray spectrum;
- $E_{peak}$ is the photon energy corresponding to the local maximum intensity of the measured X-ray spectrum;
- N is a normalization parameter;
- FWHM is a fitting parameter; and
- $\lambda$, is another fitting parameter.

10. The method of claim 5, wherein a thickness of the K-edge filter is selected such that the photon energy corresponding to the intensity of one half of the local maximum intensity of the measured X-ray spectrum is within a range from 99% to 101% of the K-edge energy.

11. A method of calibrating a radiation detector system including a plurality of energy bins per each detector, wherein the method comprises:

generating a set of N standard bin count distributions by irradiating a test radiation detector system with an X-ray beam attenuated by a respective one of N different K-edge filters for each of at least one X-ray source energy setting, N being an integer greater than one;

calibrating energy bins of detectors of a target radiation detector system by generating measured bin count distributions for each calibration setting in which a respective one of the N different K-edge filters attenuates a source X-ray beam, wherein calibration parameters of the detectors of the target radiation detector system are adjusted to match each of the measured bin count distributions to a corresponding standard bin count distribution generated with a same one of the N different K-edge filters and a same X-ray source energy setting;

performing the method of claim 1 on each radiation detector within the radiation detector system; and adjusting electronics parameters for the radiation detector system to a provide an energy resolution within a specification range based on a measured energy resolution obtained by performing the method of claim 1.

* * * * *